United States Patent
Wu et al.

(10) Patent No.: US 8,659,559 B2
(45) Date of Patent: Feb. 25, 2014

(54) ACTIVE AND PASSIVE MATRIX DISPLAY DEVICES WITH CAPACITIVE TOUCH DETECTION

(75) Inventors: Hung-Wei Wu, Taipei County (TW); Ming-Hsien Lee, Hsin Chu (TW); Tsan-Hwi Chen, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 980 days.

(21) Appl. No.: 12/759,258

(22) Filed: Apr. 13, 2010

(65) Prior Publication Data

US 2011/0109568 A1    May 12, 2011

(30) Foreign Application Priority Data

Nov. 9, 2009 (TW) .............................. 98137878 A

(51) Int. Cl.
 *G06F 3/041* (2006.01)
(52) U.S. Cl.
 USPC ...................... 345/173; 178/18.06; 178/19.03
(58) Field of Classification Search
 USPC ..................... 345/173–183; 178/18.01–18.11, 178/19.01–19.07, 20.01–20.04
 See application file for complete search history.

(56) References Cited

U.S. PATENT DOCUMENTS

| | | | |
|---|---|---|---|
| 5,008,497 A | | 4/1991 | Asher |
| 5,592,197 A | * | 1/1997 | Tagawa .......................... 345/173 |
| 5,631,670 A | * | 5/1997 | Tomiyoshi et al. ........... 345/173 |
| 5,905,489 A | * | 5/1999 | Takahama et al. ............ 345/174 |
| 6,177,918 B1 | * | 1/2001 | Colgan et al. ................... 345/87 |
| 6,239,788 B1 | * | 5/2001 | Nohno et al. .................. 345/173 |
| 7,312,409 B2 | | 12/2007 | Lo et al. |
| 7,372,455 B2 | | 5/2008 | Perski et al. |
| 7,737,963 B2 | * | 6/2010 | Moon ........................... 345/212 |
| 8,115,718 B2 | | 2/2012 | Chen et al. |
| 8,373,667 B2 | * | 2/2013 | Selker ........................... 345/173 |
| 8,432,364 B2 | * | 4/2013 | Krah .............................. 345/173 |
| 2003/0197691 A1 | * | 10/2003 | Fujiwara et al. .............. 345/179 |
| 2004/0227743 A1 | | 11/2004 | Brown |
| 2006/0262099 A1 | * | 11/2006 | Destura et al. ................ 345/173 |
| 2008/0042940 A1 | * | 2/2008 | Hasegawa ....................... 345/76 |
| 2009/0079707 A1 | * | 3/2009 | Kaehler et al. ................ 345/174 |
| 2010/0110035 A1 | * | 5/2010 | Selker ........................... 345/174 |
| 2011/0007019 A1 | * | 1/2011 | Tasher .......................... 345/174 |
| 2011/0025635 A1 | | 2/2011 | Lee |

FOREIGN PATENT DOCUMENTS

| | | |
|---|---|---|
| TW | I240079 B | 9/2005 |
| TW | I288826 B | 10/2007 |
| TW | 200828212 A | 7/2008 |
| TW | I300548 B | 9/2008 |
| TW | 200945155 A1 | 11/2009 |

* cited by examiner

*Primary Examiner* — Gene W Lee
(74) *Attorney, Agent, or Firm* — Muncy, Geissler, Olds & Lowe, P.C.

(57) ABSTRACT

A touch display apparatus is disclosed. Without additional touch device, either the reversed AM structure or a conventional PM structure is provided to combine with the human body's conductive properties and the noise-immune sensing circuit design, thereby to achieve the purpose of displaying images and performing multi-touch detection simultaneously. Thus, the hardware cost and the power consumption are reduced.

30 Claims, 29 Drawing Sheets

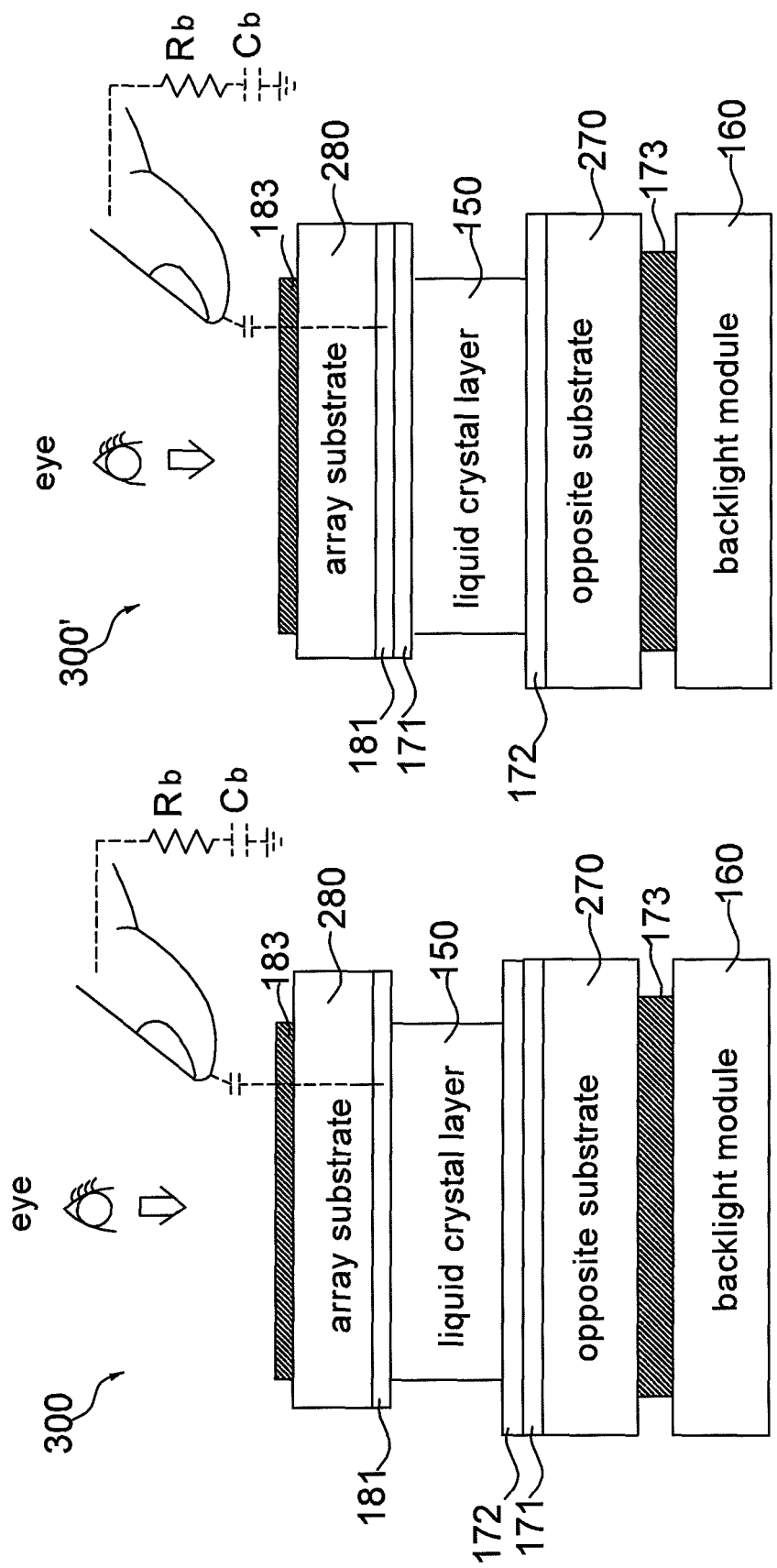

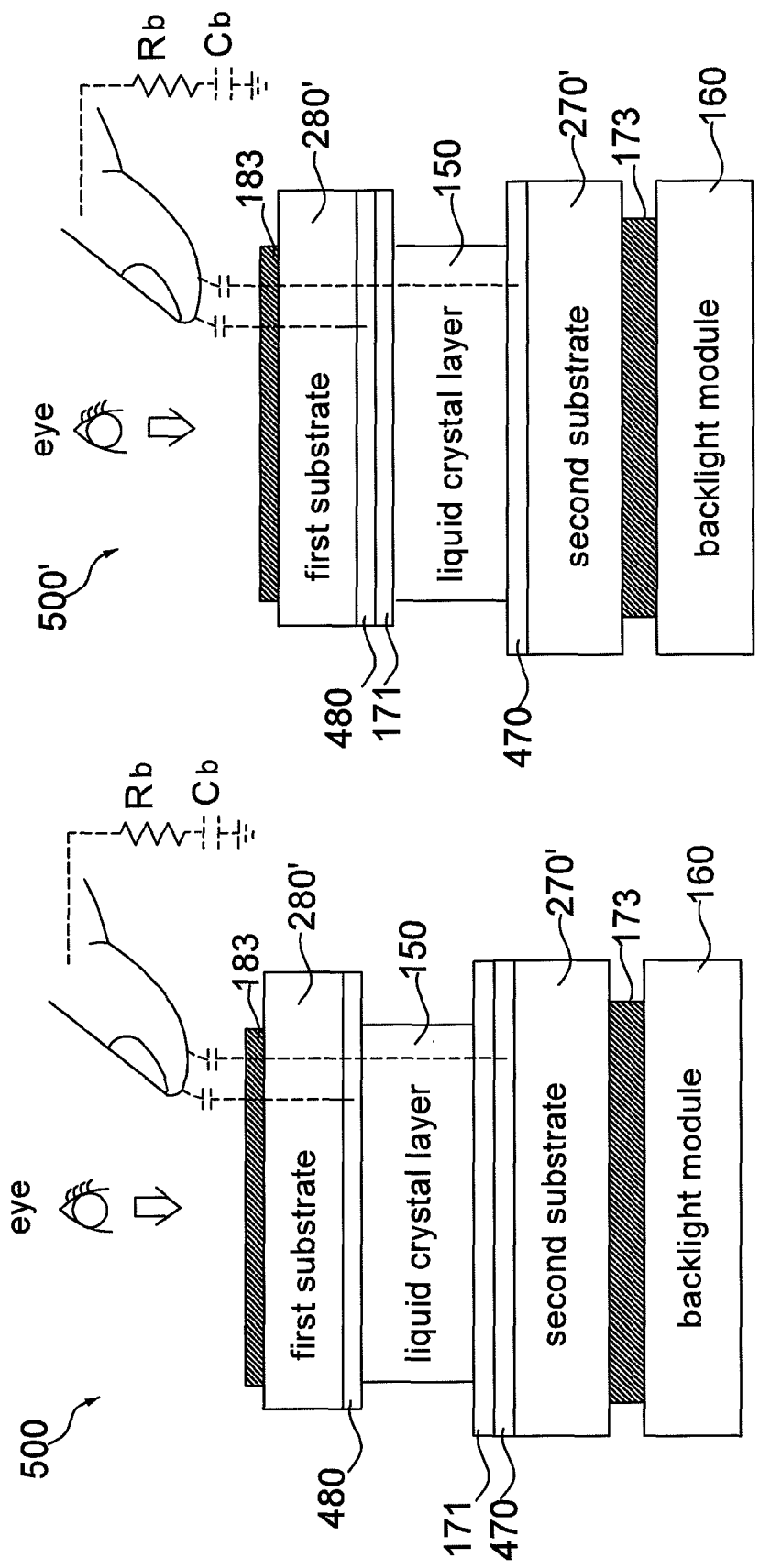

ACTIVE AND PASSIVE MATRIX DISPLAY DEVICES WITH CAPACITIVE TOUCH DETECTION

This application claims the benefit of the filing date of Taiwan Application Ser. No. 098137878, filed on Nov. 9, 2009, the content of which is incorporated herein by reference.

BACKGROUND OF THE INVENTION

1. Field of the Invention

The invention relates to touch display device, particularly to a touch display device integrating image display with multi-touch detection.

2. Description of the Related Art

FIG. 1A is a cross-section view of a conventional thin film transistor liquid crystal display (TFT-LCD). FIG. 1B is a zoomed-in view of a portion of a signal layer, a controller, a gate driver and a source driver according to the TFT-LCD in FIG. 1A. FIG. 1C is a zoomed-in view of a portion of a pixel array according to FIG. 1B. Regarding to FIGS. 1A-1C, the TFT-LCD uses an active matrix addressing scheme to update the pixel array.

Referring to FIGS. 1A-1C, a polarizer 183 is disposed below an array substrate 180 and arranged to convert an incident beam of electromagnetic waves (light) of undefined or mixed polarization into a beam with well-defined polarization. A polarizer 173 is disposed above an opposite substrate 170 and arranged to detect the polarization direction of the incident beam after the incident beam passes through a liquid crystal layer 150 and the polarization of the incident beam is rotated. Below the opposite substrate 170 is a color filter 171 and below the color filter 171 is a common electrode 172. The color filter 171 is composed of a red filter layer, a green filter layer and a blue filter layer, representing three primary colors RGB of each pixel. The common electrode 172 is made of an Indium Tin Oxide (ITO) transparent thin film. A backlight module 160 is arranged to increase readability in low light conditions.

A signal layer 181 is formed on the array substrate 180. The signal layer 181 includes a plurality of scan lines disposed almost in parallel with each other and a plurality of data lines disposed almost in parallel with each other to intersect with the scan lines, thereby to form a pixel array. A controller 130 is used to control a source driver 110 and a gate driver 120 through the data lines and the scan lines (For purposes of clarity and ease of description, only three data lines D1-D3 and three scan lines G1-G3 are shown in FIG. 1B) to store image data in each pixel of the pixel array. A TFT (thin film transistor) 115, a liquid crystal (LC) capacitor 116 and a storage capacitor 117 are provided in the vicinity of each point of intersection between the data lines and scan lines. A pixel electrode 116a, a common electrode 172 and a LC layer 150 form the LC capacitor 116. The TFT 115 acts like a switch. When a gate pulse turns on a TFT 115 of each pixel of a specified scan line, display voltages will be stored in a LC capacitor 116 of each pixel. The other side of the LC capacitor 116 is connected to the common electrode 172 serving as a reference voltage for display voltages. The display voltage stored in the LC capacitor 116 rotates the direction of the liquid crystal alignment to change the polarization of the incident light. The display voltage, together with two polarizer 173 and 183, determines the luminance value of the corresponding pixel. The function of the storage capacitor 117 is to assist the LC capacitor 116 in storing charges.

A prior touch display device is characterized as a display device equipped with an additional touch detecting device, thereby reducing its luminance and increasing hardware cost.

SUMMARY OF THE INVENTION

In view of the above-mentioned problems, an object of the invention is to provide an active-matrix (AM) touch display device, with a reversed AM structure combined with human body's conductive properties and a noise-immune sensing circuit design, thereby to achieve the purpose of displaying images and performing multi-touch detection simultaneously To achieve the above-mentioned object, the AM touch display device, comprising: an array substrate having a top surface, a bottom surface opposite the top surface and a signal layer, the signal layer disposed on the bottom surface, the signal layer including plural scan lines and plural data lines, wherein pixels are respectively formed at intersections of the plural scan lines and the plural data lines, and each pixel includes a switching element and a pixel electrode; an opposite substrate disposed to be opposite the array substrate and having a common electrode opposite the pixel electrodes, wherein the opposite substrate is positioned farther from a user than the array substrate is; a display material layer sandwiched between the array substrate and the opposite substrate; a gate driver for sequentially supplying a gate pulse to the plural scan lines, wherein output terminals of the gate driver and the scan lines are connected at plural first connection nodes; a source driver for supplying plural image data to the plural data lines, wherein output terminals of the source driver and the data lines are connected at plural second connection nodes; at least one sensing circuit for performing touch detection on at least one of the plural scan lines and the plural data lines; and, a controller for controlling the gate driver, the source driver and the at least one sensing circuit. Here, each of the at least one sensing circuit comprises: a driving unit for supplying a driving signal to at least one of the plural first connection nodes and the plural second connection nodes according to a specified frequency; and, a detecting unit for performing signal extraction on at least one of output signals of the plural first connection nodes and the plural second connection nodes to generate a measuring value.

Another object of the invention is to provide a passive-matrix (PM) touch display device, comprising: a first substrate having a top surface, a bottom surface opposite the top surface and a first signal layer, the first signal layer disposed on the bottom surface, the first signal layer including plural first signal lines; a second substrate disposed to be opposite the first substrate and having a second signal layer opposite the first signal layer, wherein the second substrate is positioned farther from an user than the first substrate is; a display material layer sandwiched between the first substrate and the second substrate; a first signal driver for supplying at least one first voltage signal to the plural first signal lines, wherein output terminals of the first signal driver and the first signal lines are connected at plural first connection nodes; a second signal driver for supplying at least one second voltage signal to the plural second signal lines, wherein output terminals of the second signal driver and the second signal lines are connected at plural second connection nodes; at least one sensing circuit for performing touch detection on at least one of the plural first signal lines and the plural second signal lines; and, a controller for controlling the first driver, the second signal driver and the at least one sensing circuit. Here, each of the at least one sensing circuit comprises: a driving unit for supplying a driving signal to at least one of the plural first connection nodes and the plural second connection nodes according to a specified frequency; and, a detecting unit for performing signal extraction on at least one of output signals of the plural first connection nodes and the plural second connection nodes to generate a measuring value.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3A is a cross-section view of an AM touch display device according to another embodiment of the invention.

FIG. 3C is a cross-section view of an AM touch display device according to another embodiment of the invention, with a color filter disposed on a signal layer.

FIG. 5A is a cross-section view of a PM touch display device according to another embodiment of the invention.

FIG. 5C is a cross-section view of a PM touch display device according to another embodiment of the invention, with a color filter disposed on a first signal layer.

DETAILED DESCRIPTION OF THE INVENTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1C:
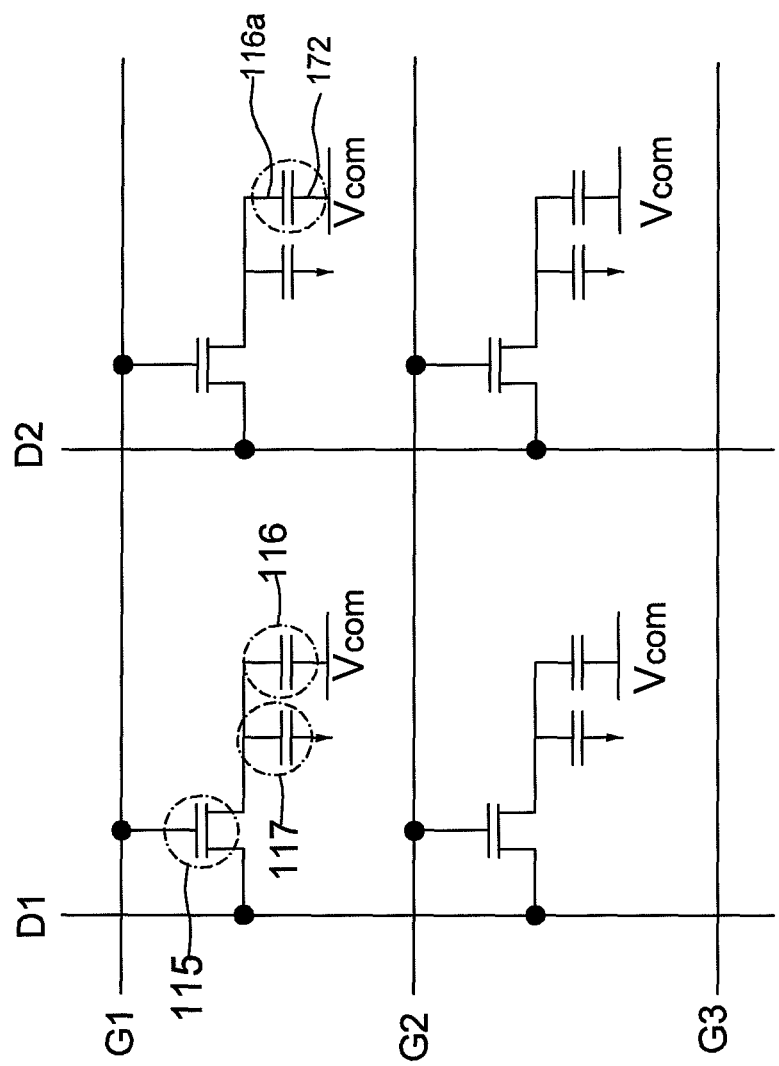
FIG. 1C is a zoomed-in view of a portion of a pixel array according to FIG. 1B.
Figure 2A:
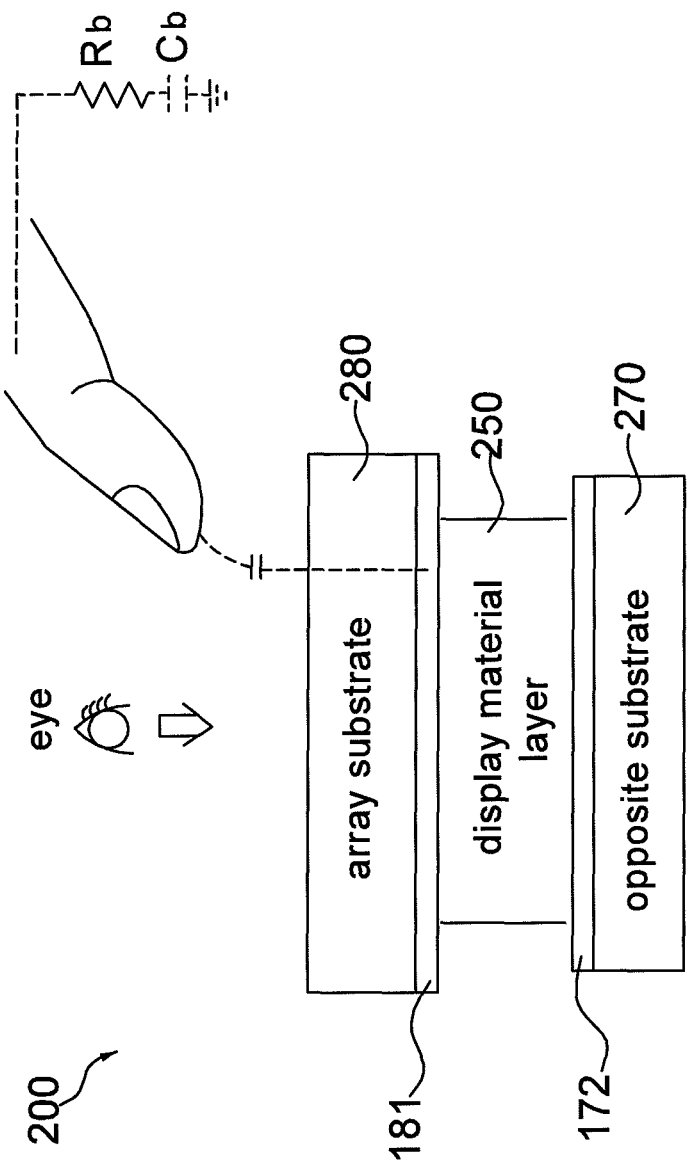
FIG. 2A is a cross-section view of an active-matrix (AM) touch display device according to an embodiment of the invention.
Figure 2B:
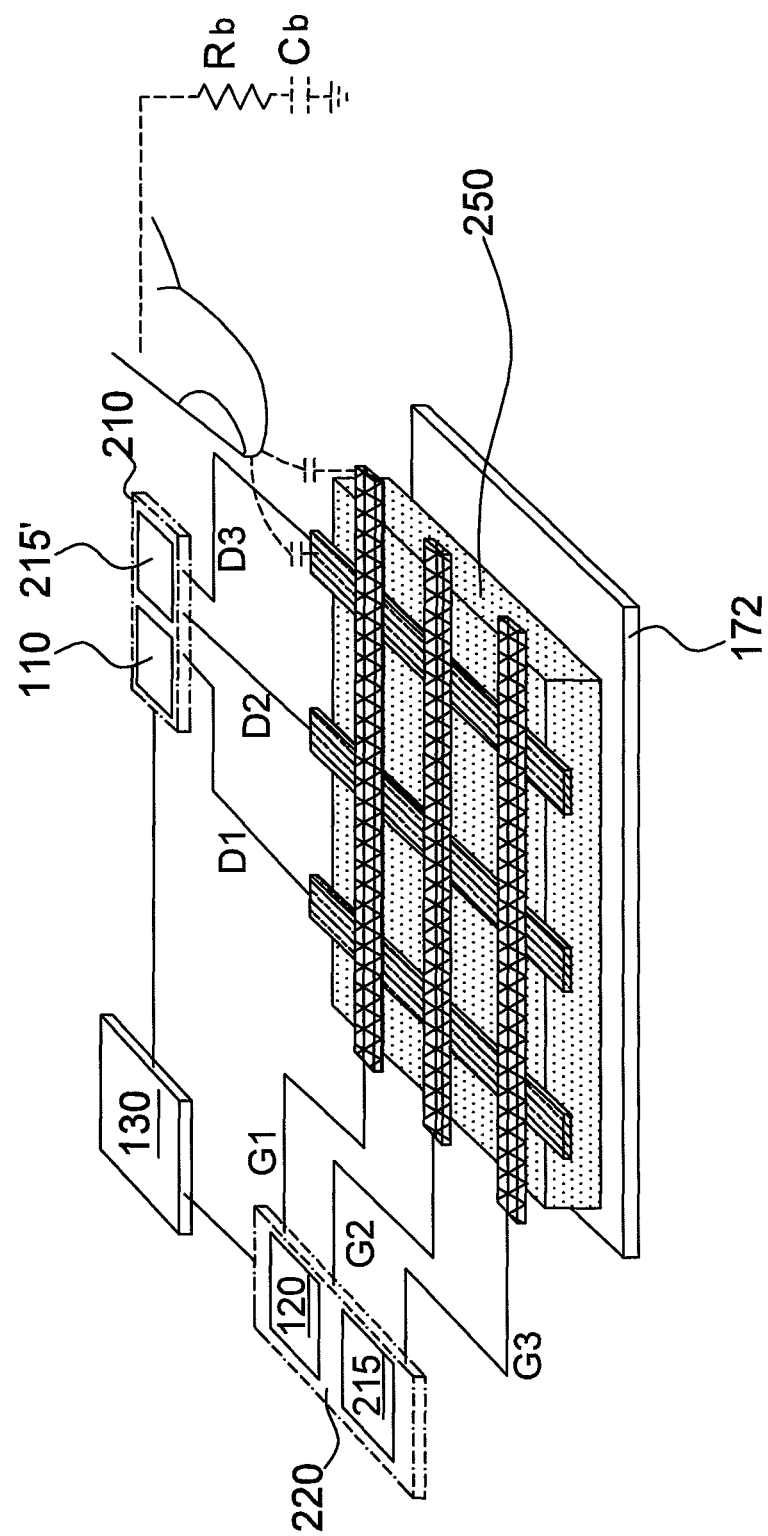
FIG. 2B is a zoomed-in view of a portion of a signal layer, a controller, a gate driving and sensing circuit and a source driving and sensing circuit according to the AM touch display device in FIG. 2A.

FIG. 2A is a cross-section view of an active-matrix (AM) touch display device according to an embodiment of the invention. FIG. 2B is a zoomed-in view of a portion of a signal layer, a controller, a gate driving and sensing circuit and a source driving and sensing circuit according to the AM touch display device in FIG. 2A. Referring to FIGS. 2A and 2B, an AM touch display device 200 of the invention includes, from top to bottom (along a user's line of sight), an array substrate 280, a display material layer 250 and an opposite array 270. Since a user is at the top of FIG. 2A, the opposite substrate 270 is positioned farther from the user than the array substrate 280 is. A common electrode 172 is formed on the top surface of the opposite array 270 while a signal layer 181 is formed on the bottom surface of the array substrate 280. The signal layer 181 includes a plurality of scan lines disposed almost in parallel with each other and a plurality of data lines disposed almost in parallel with each other to intersect with the scan lines, thereby to form a pixel array. For purposes of clarity and ease of description, only three data lines D1-D3 and three scan lines G1-G3 are shown in FIG. 2B and will be described herein. At each cross point of the data lines and scan lines, one pixel including a TFT 115 and a pixel electrode 116a (as shown in FIG. 1C) is connected to store the charges representing the image data to be displayed. Here, the TFT 115 functions like a switching element. Throughout the specification, elements that are similar or identical in various figures are labeled with the same numeral and will not be again discussed. Example materials for the array substrate 280 and the opposite substrate 270 include, without limitation, plastic, glass and metal foil.

Figure 1A:
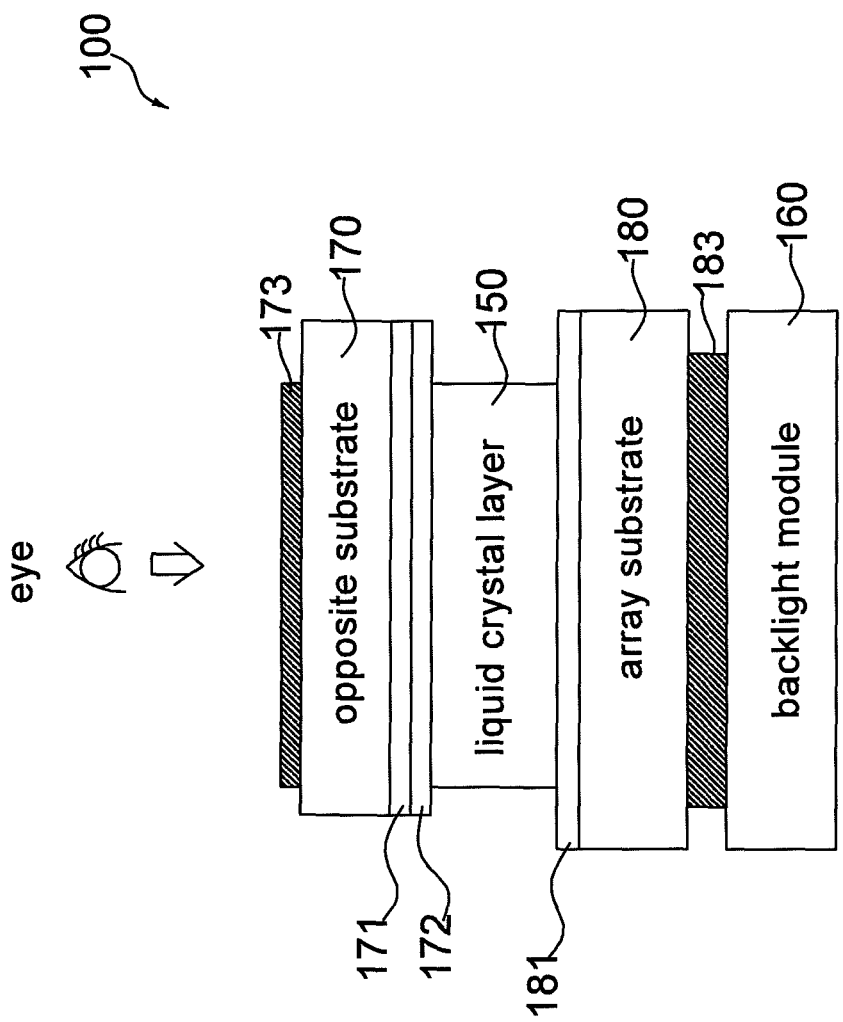
FIG. 1A is a cross-section view of a conventional thin film transistor liquid crystal display.

With respect to the prior AM structure in FIG. 1A, since a conductor layer (i.e., the common electrode 172) isolates a user's finger from the signal layer 181 of the array substrate 180, the scan lines and the data lines are not able to detect a finger touch. According to the invention, after the positions of the array substrate and the opposite substrate are reversed, the array substrate 280 having the scan lines and the data lines is positioned at the top of the device 200 (on the use's side) while the opposite substrate 270 having a common electrode 172 is positioned at the bottom of the device (i.e., positioned farther from the user than the array substrate 280 is) as shown in FIG. 2A. Compared to FIG. 1A, it is clear that the positions of the opposite substrate 270 and the array substrate 280 in FIG. 2A are reversed, so the AM structure in FIG. 2A is hereinafter called "reversed AM structure." With respect to the reversed AM structure of the invention, the signal layer 181 gets closer to the user (compared to the prior AM structure in FIG. 1A) and the common electrode 172 does not shield the coupling capacitance between the signal layer 181 and the user's finger. Accordingly, the data lines and the scan lines arranged in a matrix pattern can be used to detect a capacitive object's touch, e.g., a finger touch, by means of detecting a current leakage through the capacitive object to the ground. Without modifying the original manufacturing process of the opposite substrate 270 and the array substrate 280, the invention just reverses the positions of the opposite substrate 270 and the array substrate 280 (compared to FIG. 1A) and then injects a display material layer 250 therebetween. It is noted that the opposite substrate 270 and the array substrate 280 arranged in reverse positions does not affect the display quality. Despite the optical quality may not be exactly the same, however, human eyes can not distinguish the subtle difference of display quality between "conventional arrangement" and "reversed arrangement".

Figure 1B:
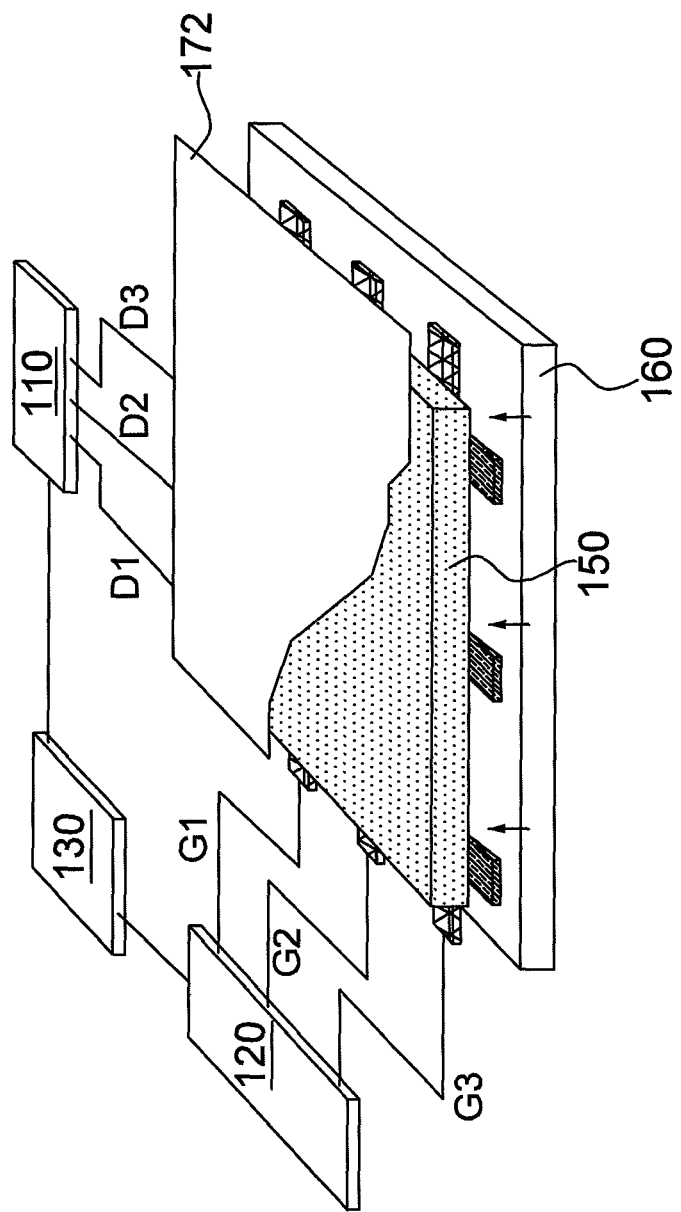
FIG. 1B is a zoomed-in view of a portion of a signal layer, a controller, a gate driver and a source driver according to the TFT-LCD in FIG. 1A.

Comparing FIGS. 1B and 2B, because the signal layer 181 and the common electrode 172 in the above-mentioned reversed AM structure is "upside down", we can gain two advantages for touch applications. First, the data lines and the scan lines of the signal layer 181 can be used to detect a capacitive object's touch, e.g., a finger touch, by means of detecting a current leakage through the capacitive object to the ground. Second, the common electrode 172 does not shield the coupling capacitance between the signal layer 181 and the user's finger.

Figure 6A:
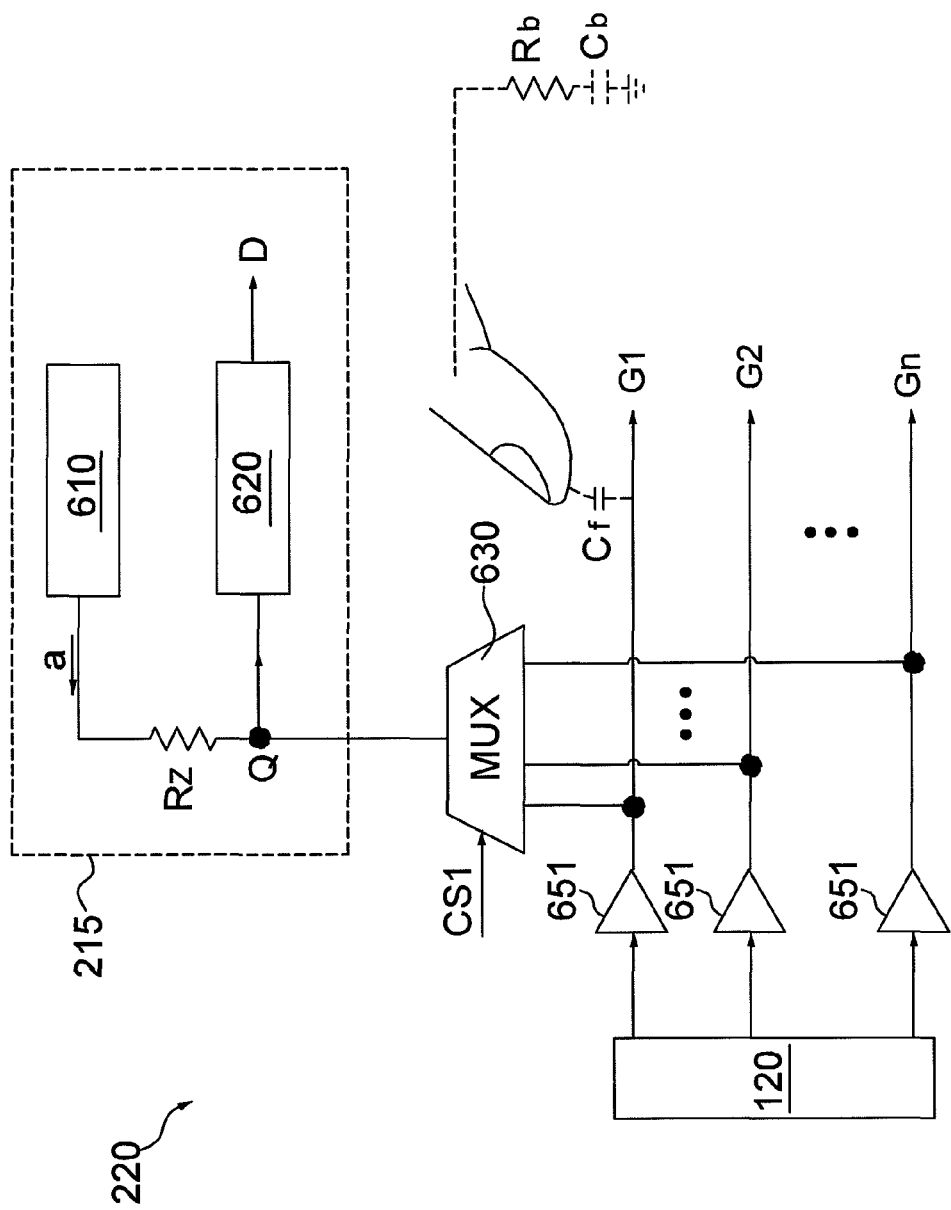
FIG. 6A is a circuit schematic diagram of a gate driving and sensing circuit according to an embodiment of the invention.
Figure 6B:
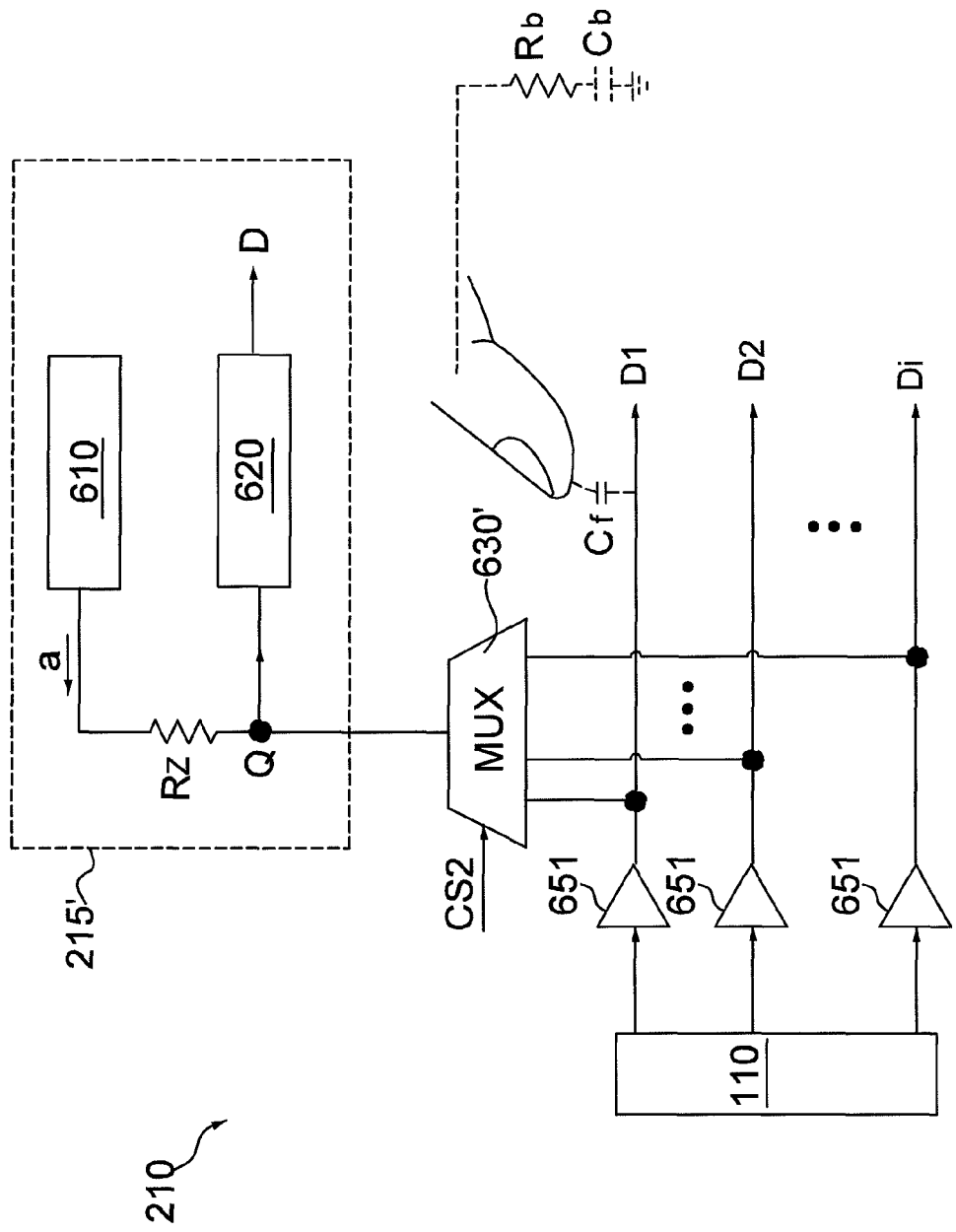
FIG. 6B is a circuit schematic diagram of a source driving and sensing circuit according to an embodiment of the invention.

Referring to FIG. 2B, a controller 130 is used to control a source driving and sensing circuit 210 and a gate driving and sensing circuit 220. The source driving and sensing circuit 210 is connected with the data lines D1-D3 while the gate driving and sensing circuit 220 is connected with the scan lines G1-G3. The source driving and sensing circuit 210 includes a source driver 110 and a sensing circuit 215' while the gate driving and sensing circuit 220 includes a gate driver 120 and a sensing circuit 215. In practice, the source driver 110 and the sensing circuit 215' are integrated into one chip 210 while the gate driver 120 and the sensing circuit 215 are integrated into another chip 220. The controller 130, the chips 210 and 220 may be disposed on one of the array substrate 280 and the opposite substrate 270, or mounted to the exterior of the array substrate 280, e.g., the frame of a display panel. The source driver 110 supplies the image data to the data lines while the gate driver 120 sequentially supplies a gate pulse to the scan lines. The sensing circuit 215' connected to connection nodes of the output buffers 651 and the data lines D1-Di is provided to perform touch detection on the data lines as shown in FIG. 6B. The sensing circuit 215 connected to connection nodes of the output buffers 651 and the scan lines G1-Gn is provided to perform touch detection on the scan lines as shown in FIG. 6A. In this specification, although the sensing circuits 215 and 215' are labeled with different numerals and placed at different positions, they have the same circuit configuration. The operations of the sensing circuits 215 and 215' will be described with reference to FIGS. 6A-6C and 7A-7H.

Example materials for the display material layer 250 include, without limitation, a plurality of microcapsules and a plurality of electroluminescence (EL) elements. In an embodiment, when the display material layer 250 is made of the plurality of microcapsules, the AM touch display device 200 realizes a display device integrating touch detection with electrophoretic display (EPD). In an alternate embodiment, when the display material layer 250 is made of the plurality of EL elements, the AM touch display device 200 achieves functions of increasing luminance and saving power consumption since an EL display panel is capable of emitting light actively. On condition that the EL elements can emit three primary colors of light—R, G and B, or the AM touch display device 200 serves as a monochrome display, the AM touch display device 200 realizes a display device integrating touch detection with EL display. Since the microcapsules have their own colors, the EL elements can emit three primary colors RGB, and the AM touch display device 200 only needs to provide a monochrome display, it is not necessary for the AM touch display device 200 to include a color filter. The EL element includes, without limitation, a light emitting diode (LED), an organic light emitting diode (OLED) and a polymer light emitting diode (PLED).

Figure 2C:
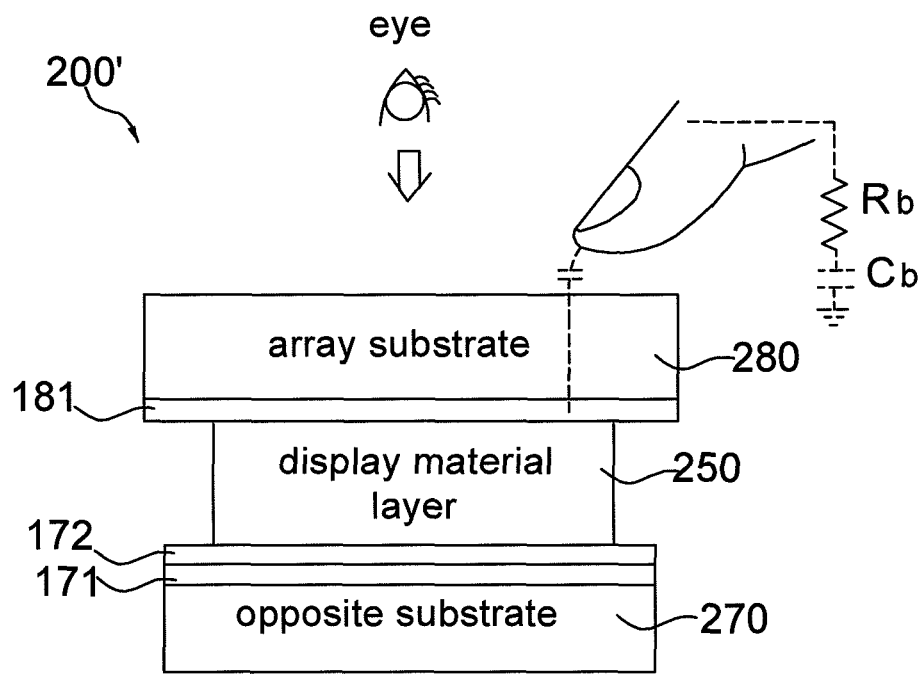
FIG. 2C is a cross-section view of an AM touch display device according to another embodiment of the invention, with a color filter interposed between a common electrode and an opposite substrate.
Figure 2D:
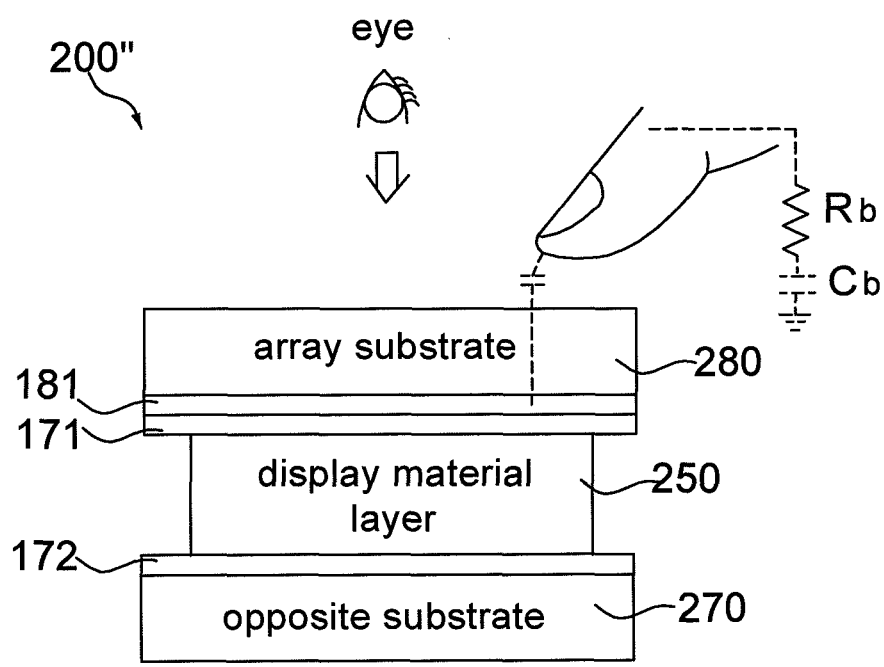
FIG. 2D is a cross-section view of an AM touch display device according to another embodiment of the invention, with a color filter disposed on a signal layer.

On the other hand, when the EL elements fail to emit three primary colors RGB and the AM touch display device 200' needs to provide a color display, it is necessary for the AM touch display device 200' to include a color filter. For example, in the AM touch display device 200' shown in FIG. 2C, a color filter 171 is interposed between the common electrode 172 and the opposite substrate 270. Alternatively, in the AM touch display device 200" shown in FIG. 2D, a color filter 171 is disposed on the signal layer 181.

Figure 3B:
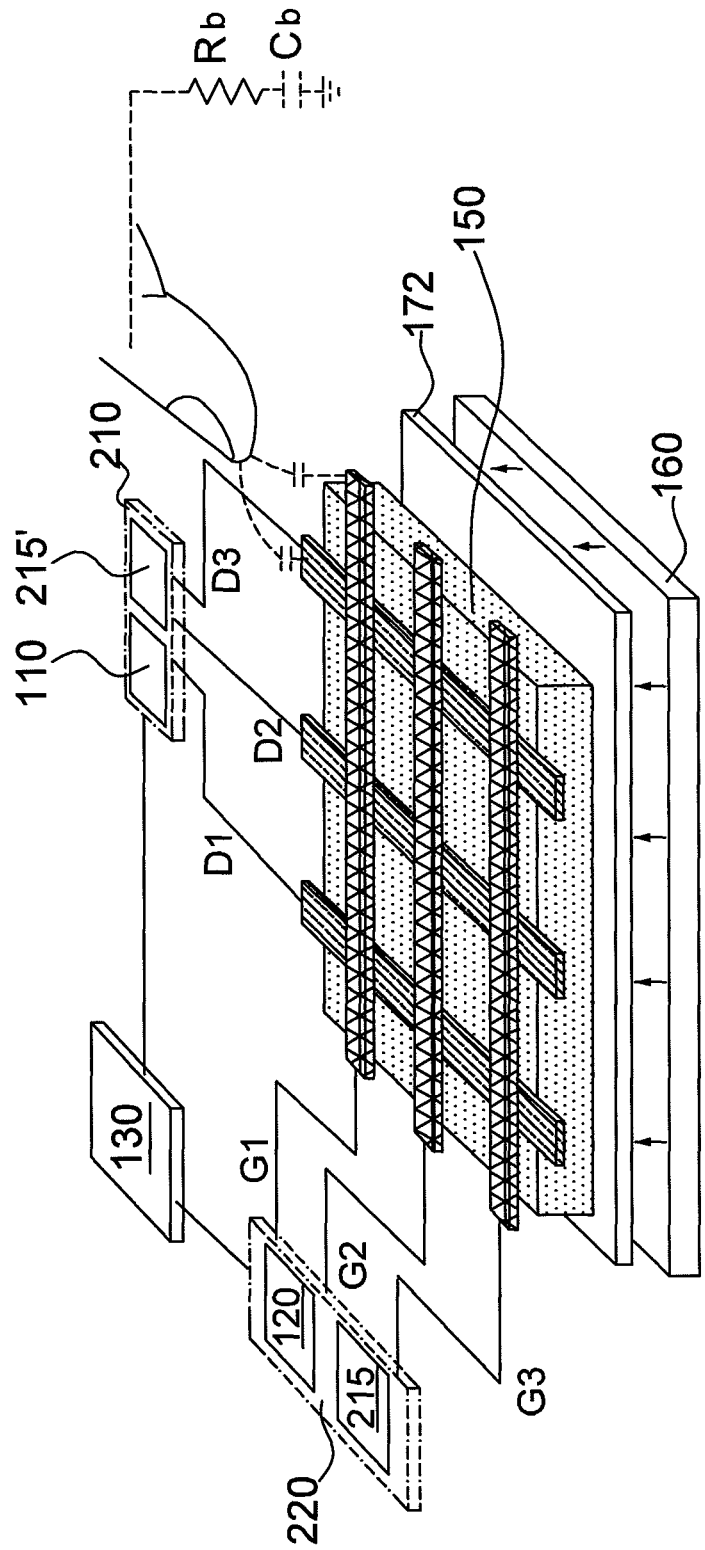
FIG. 3B is a zoomed-in view of a portion of a signal layer, a controller, a gate driving and sensing circuit and a source driving and sensing circuit according to the AM touch display device in FIG. 3A.

FIG. 3A is a cross-section view of an active-matrix (AM) touch display device according to another embodiment of the invention. FIG. 3B is a zoomed-in view of a portion of a signal layer, a controller, a gate driving and sensing circuit and a source driving and sensing circuit according to the AM display device in FIG. 3A. Referring to FIG. 3A, an AM touch display device 300 of the invention includes, from top to bottom (along a user's line of sight), an array substrate 280, a liquid crystal layer 150, an opposite array 270 and a backlight module 160. Example materials for the array substrate 280 and the opposite substrate 270 include, without limitation, plastic, glass and metal foil. The AM touch display device 300, similar to the AM touch display device 200, also has the above-mentioned reversed AM structure. With respect to the reversed AM structure of the invention, the signal layer 181 gets closer to the user (compared to the prior AM structure in FIG. 1A) and the common electrode 172 does not shield the coupling capacitance between the signal layer 181 and the user's finger. Accordingly, the data lines and the scan lines arranged in a matrix pattern can be used to detect a capacitive object's touch, e.g., a finger touch, by means of detecting a current leakage through the capacitive object to the ground. Without modifying the original manufacturing process of the opposite substrate 270 and the array substrate 280, the invention just reverses the positions of the opposite substrate 270 and the array substrate 280 (compared to FIG. 1A) and then injects a display material layer 250 therebetween. It is noted that the opposite substrate 270 and the array substrate 280 arranged in reverse positions does not affect the display quality. Despite the optical quality may not be exactly the same, however, human eyes can not distinguish the subtle difference of display quality between "conventional arrangement" and "reversed arrangement."

A signal layer 181 is formed on the bottom surface of the array substrate 280 while a polarizer 183 is formed on the top surface (opposite the bottom surface) of the array substrate 280. An anti-reflection (AR) film (not shown) is formed on the polarizer 183 and an anti-glare (AG) film (not shown) is formed on the AR film. The AR film is used to prevent reflection of external light. The AG film is used to scatter external light, thereby exhibiting an anti-glare effect. Of course, in view of hardware cost, the polarizer 183 may be AG coated, AR coated or neither. Above the opposite substrate 270 is a color filter 171 and above the color filter 171 is a common electrode 172. Further, below the opposite substrate 270 is a polarizer 173. A backlight module 160 is positioned at the bottom of the AM touch display device 300. The data lines, the scan lines, the source driving and sensing circuit 210 and the gate driving and sensing circuit 220 in FIG. 3B have the same circuit configurations as those in FIG. 2B and will not be again discussed.

Comparing FIGS. 1B and 3B, because the signal layer 181 and the common electrode 172 in the above-mentioned reversed AM structure is "upside down", we can gain two advantages for touch applications. First, the data lines and the scan lines of the signal layer 181 can be used to detect a capacitive object's touch, e.g., a finger touch, by means of detecting a current leakage through the capacitive object to the ground. Second, the common electrode 172 does not shield the coupling capacitance between the signal layer 181 and the user's finger.

In an alternative embodiment, the color filter 171 is formed on the signal layer 181 of the array substrate 280 as shown in FIG. 3C. On the other hand, if the AM touch display device 300 only needs to provide a monochrome display, it operates without the color filter 171.

All of the above embodiments are characterized by a reversed AM structure. In the reversed AM structure, a voltage representing the image data applied on the data line is applied to the LC capacitor 116 through the TFT 115 to charge the LC capacitor 116. Thus, the LC capacitor 116 is configured to hold the voltage applied across the liquid crystal layer 150 in its corresponding pixel. By contrast, there are no TFT and no common electrode in a passive matrix structure. Instead, applying voltages respectively to the row electrodes on x-axis and the column electrodes on y-axis cause pixels at intersections to change their colors, thereby to produce an appropriate display. The passive matrix structure, having advantages of easy fabrication and low cost, is generally adapted for use in twisted nematic (TN) LCDs or super twisted nematic (STN) LCDs. Since the passive matrix structure does not include any common electrode, the invention directly uses the data lines and the scan lines to detect a finger touch by means of detecting a current leakage through the human body to the ground.

Figure 4A:
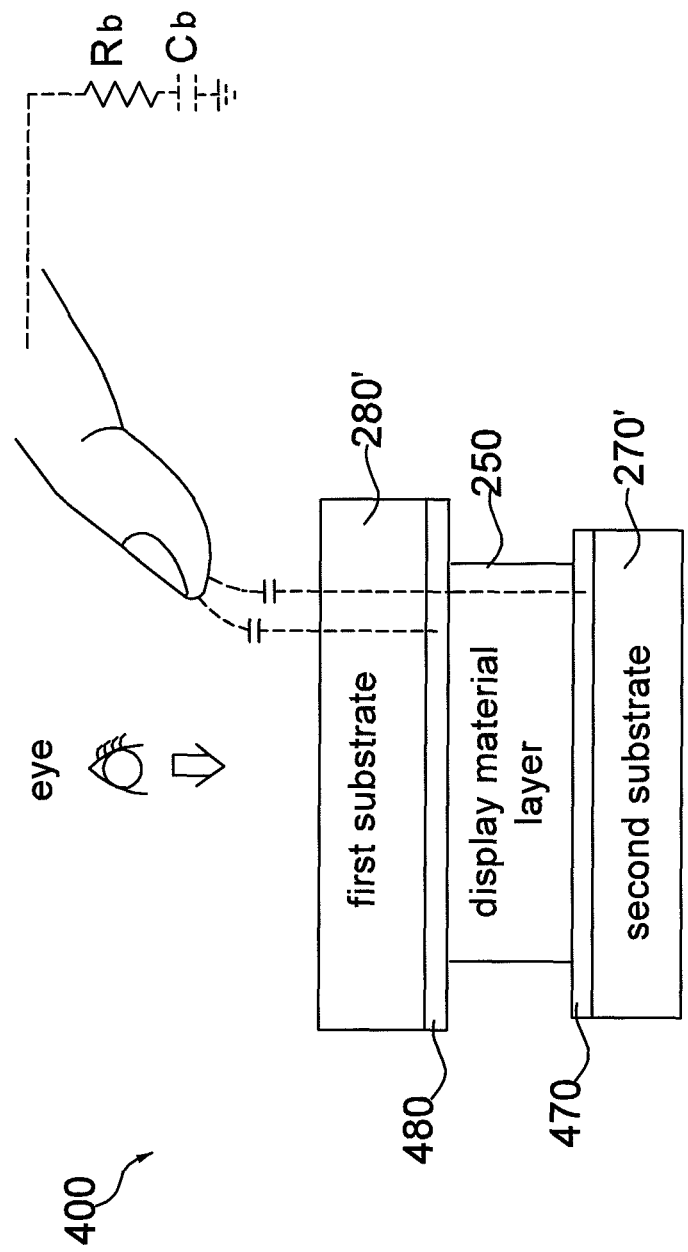
FIG. 4A is a cross-section view of a passive-matrix (PM) touch display device according to an embodiment of the invention.
Figure 4B:
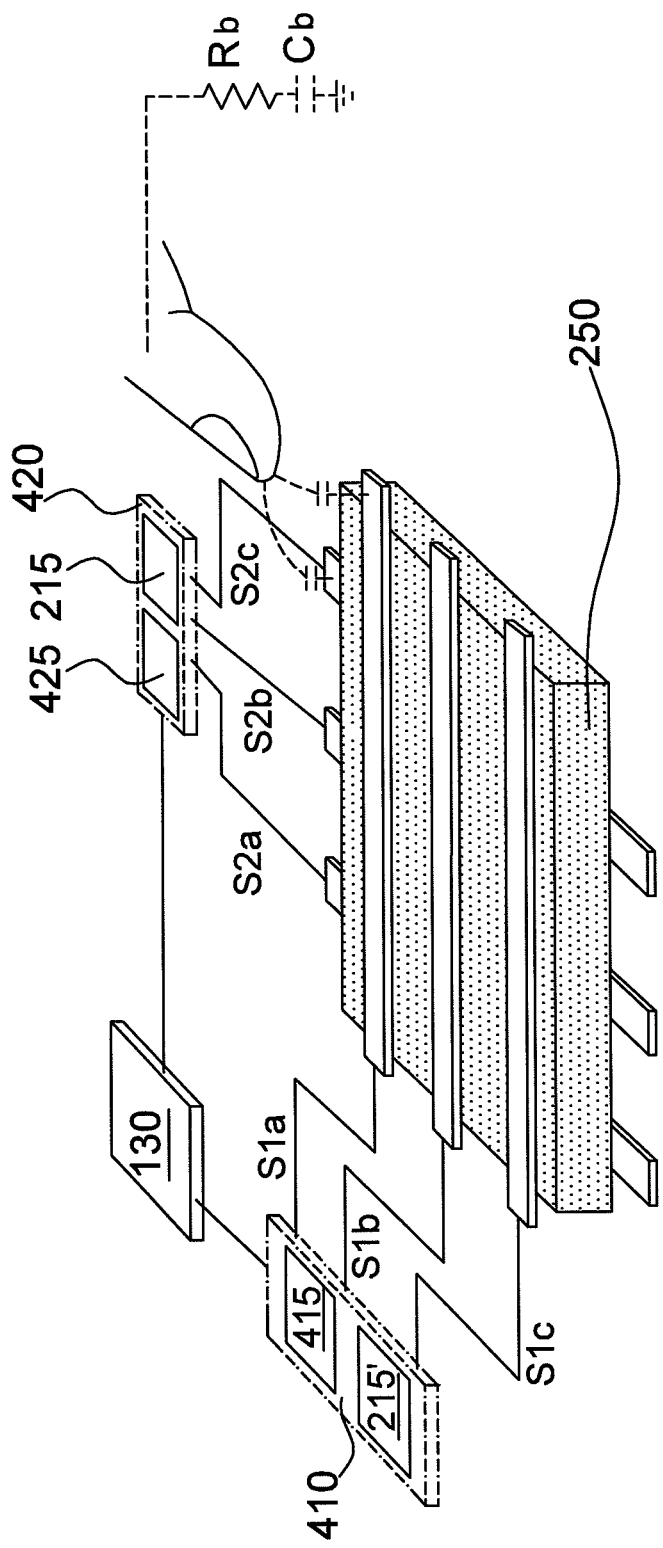
FIG. 4B is a zoomed-in view of a portion of a first signal layer, a second signal layer, a controller, a first driving and sensing circuit and a second driving and sensing circuit according to the PM touch display device in FIG. 4A.

FIG. 4A is a cross-section view of a passive-matrix (PM) touch display device according to an embodiment of the invention. FIG. 4B is a zoomed-in view of a portion of a first signal layer, a second signal layer, a controller, a first driving and sensing circuit and a second driving and sensing circuit according to the PM touch display device in FIG. 4A.

Referring to FIGS. 4A, a PM touch display device 400 of the invention includes, from top to bottom (along a user's line of sight), a first substrate 280', a display material layer 250 and a second array 270'. Since a user is at the top of FIG. 4A, the second substrate 270' is positioned farther from the user than the first substrate 280' is. Below the first substrate 280' (on its bottom surface) is a first signal layer 480 including a plurality of first signal lines disposed almost in parallel with each other. Above the second substrate 270' (on its top surface) is a second signal layer 470 including a plurality of second signal lines disposed almost in parallel with each other to be orthogonal to the first signal lines, thereby to form a pixel array. As mentioned above, since the passive matrix structure does not include any common electrodes, no conductor is interposed between the finger and either the first signal layer 480 or the second signal layer 470. Although the second signal layer 470 is farther from the user than the first signal layer 480 is, a finger touch can be correctly detected based on the passive matrix structure of the scan lines and the data lines by means of detecting a current leakage through the human body to ground.

Example materials for the display material layer 250 include, without limitation, a plurality of microcapsules and a plurality of EL elements. The EL element includes, without limitation, a light emitting diode (LED), an organic light emitting diode (OLED) and a polymer light emitting diode (PLED). In an embodiment, when the display material layer 250 is made of the plurality of microcapsules, the PM touch display device 400 realizes a display device integrating touch detection with electrophoretic display (EPD). In an alternate embodiment, when the display material layer 250 is made of the plurality of EL elements, the PM touch display device 400 achieves functions of increasing luminance and saving power consumption since an EL display panel is capable of emitting light actively. On condition that the EL elements can emit three primary colors of light—R, G and B or the PM touch display device 400 provides a monochrome display, the PM touch display device 400 realizes a display device integrating touch detection with EL display. Since the microcapsules have their own colors, the EL elements can emit three primary colors RGB and the PM touch display device 400 only needs to provide a monochrome display, it is not necessary for the PM touch display device 400 to include a color filter.

Figure 4C:
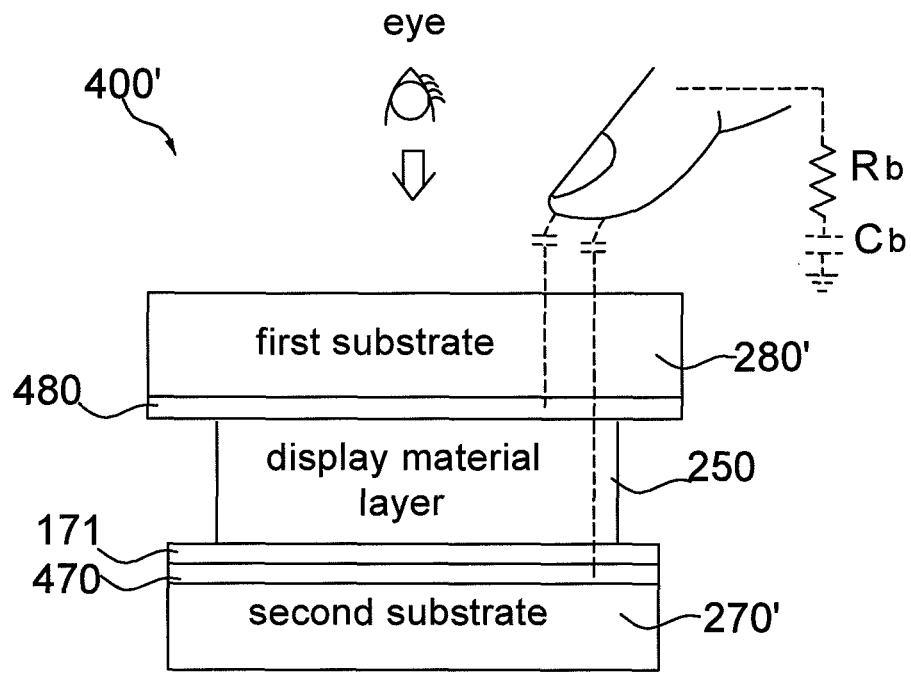
FIG. 4C is a cross-section view of a PM touch display device according to another embodiment of the invention, with a color filter disposed on a second signal layer.
Figure 4D:
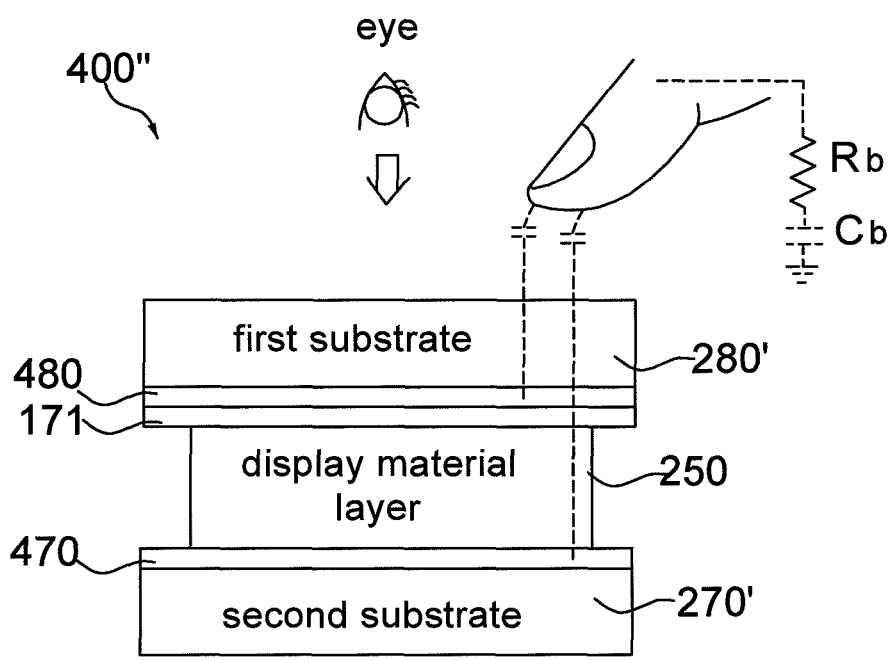
FIG. 4D is a cross-section view of a PM touch display device according to another embodiment of the invention, with a color filter disposed on a first signal layer.

On the other hand, when the EL elements fail to emit three primary colors RGB and the PM touch display device 400' needs to provide a color display, it is necessary for the PM touch display device to include a color filter 171. For example, regarding the PM touch display device 400' shown in FIG. 4C, a color filter 171 is disposed on the second signal layer 470. Alternatively, regarding the PM touch display device 400" shown in FIG. 4D, a color filter 171 is disposed below the first signal layer 480.

Referring to FIG. 4B, a controller 130 is used to control a first driving and sensing circuit 410 and a second driving and sensing circuit 420. The first signal driver 415 and the second signal driver 425 drive all pixels to display appropriate images through the first signal lines and the second signals. For purposes of clarity and ease of description, only three first signal lines S1a-S1c and three second signal lines S2a-S2c are shown in FIG. 4B and will be described herein. The first driving and sensing circuit 410 includes a first signal driver 415 and a sensing circuit 215' while the second driving and sensing circuit 420 includes a second signal driver 425 and a sensing circuit 215. In a passive matrix structure, pixels are respectively formed at the intersections of the first signal lines and the second signal lines. If the first signal lines are the scan lines, the second signal lines will be the data lines. On the contrary, if the first signal lines are the data lines, the second signal lines will be the scan lines. A difference is that the scan lines sequentially receive a gate pulse from its corresponding driver circuit, whereas the data lines receive a plurality of image data sequentially or simultaneously as the gate pulse is activated. In practice, the first signal driver 415 and the sensing circuit 215' are integrated into one chip 410 while the second signal driver circuit 425 and the sensing circuit 215 are integrated into another chip 420. The controller 130, the chips 410 and 420 may be disposed on one of the first substrate 280' and the second substrate 270', or mounted to the exterior of the first substrate 280', e.g., the frame of the display panel. The sensing circuit 215' connected to connection nodes of the output buffers 651 and the first signal lines is provided to perform touch detection on the first signal lines (as shown in FIG. 6B, with the source driver 110 replaced with the first signal driver 415). The sensing circuit 215 connected to connected to connection nodes of the output buffers 651 and the second signal lines is provided to perform touch detection on the second signal lines (as shown in FIG. 6A, with the gate driver 120 replaced with the second signal driver 425). In this specification, the sensing circuits 215 and 215' have the same circuit configuration. The operations of the sensing circuits 215 and 215' will be described with reference to FIGS. 6A-6C and 7A-7H.

Figure 5B:
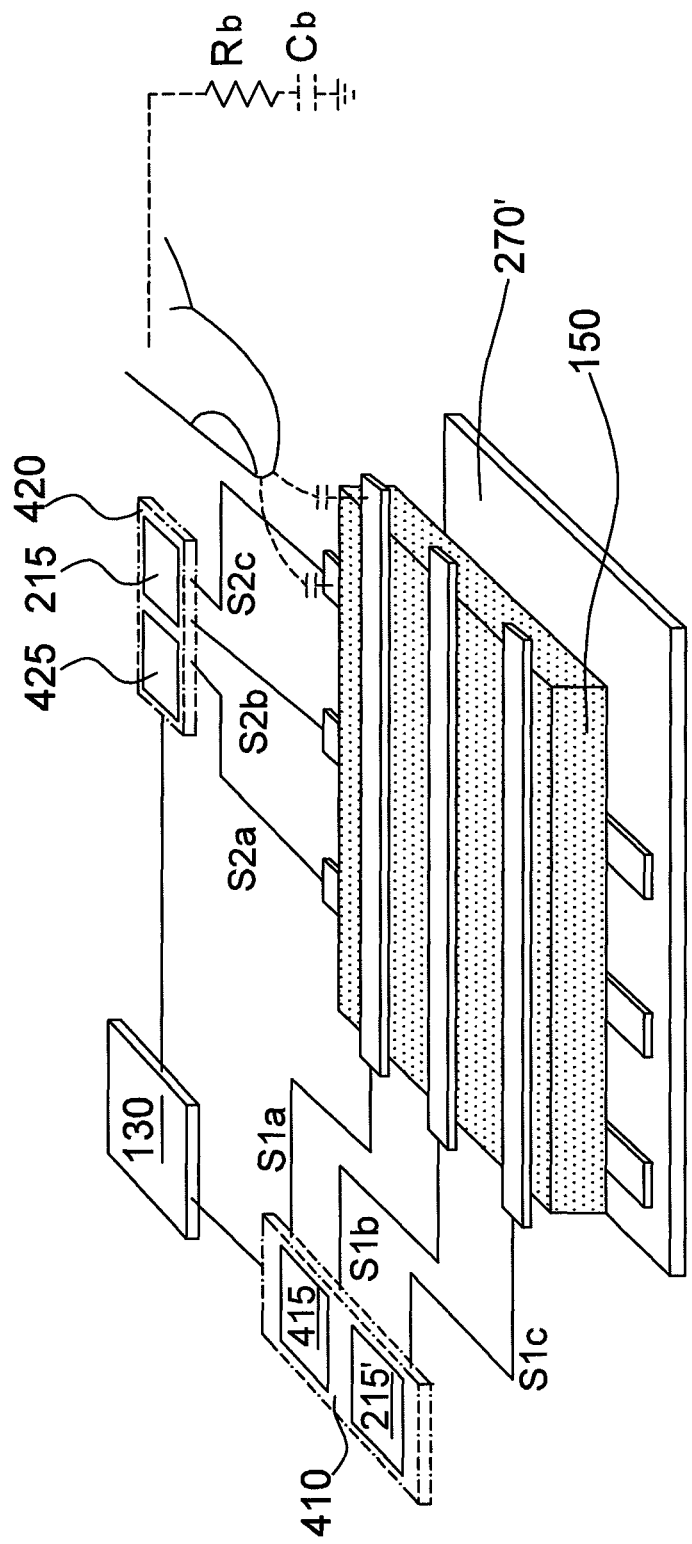
FIG. 5B is a zoomed-in view of a portion of a first signal layer, a second signal layer, a controller, a first driving and sensing circuit and a second source driving and sensing circuit according to the PM touch display device in FIG. 5A.

FIG. 5A is a cross-section view of a PM touch display device according to another embodiment of the invention. FIG. 5B is a zoomed-in view of a portion of a first signal layer, a second signal layer, a controller, a first driving and sensing circuit and a second source driving and sensing circuit according to the PM touch display device in FIG. 5A. Referring to FIGS. 5A and 5B, a PM touch display device 500 of the invention includes, from top to bottom (along a user's line of sight), a first substrate 280', a liquid crystal layer 150, a second substrate 270' and a backlight module 160.

A first signal layer 480 is formed on the bottom surface of the first substrate 280' while a polarizer 183 is formed on the top surface of the first substrate 280'. An AR film (not shown) is formed on the polarizer 183 and an AG film (not shown) is formed on the AR film. The AR film is used to prevent reflection of external light; meanwhile, the AG film is used to scatter external light, thereby exhibiting an anti-glare effect. In view of hardware cost, the polarizer 183 may be AG coated or AR coated or neither. A second signal layer 470 is formed on the top surface of the second substrate 270' and a color filter 171 is formed on the second signal layer 470. Further, a polarizer 173 is formed on the bottom surface of the second substrate 270'. The backlight module 160 is positioned at the bottom of the PM touch display device 500. The first signal lines, the second signal lines, the controller, the first driving and sensing circuit 410 and the second driving and sensing circuit 420 in FIG. 5B have the same circuit configurations as those in FIG. 4B and will not be again discussed.

In an alternative embodiment, the color filter 171 is formed on the first signal layer 480 as shown in FIG. 5C. If the PM touch display device 500 only needs to provide a monochrome display, it operates without the color filter 171. It is noted that, since the liquid crystal has very slow response times, the first signal driver 415 and the second signal driver 425 need to apply higher voltage levels between the electrodes, thereby causing the liquid crystal to change the phase of the light passing through the liquid crystal layer 150 in each of the PM touch display devices 500 and 500'.

FIG. 6A is a circuit schematic diagram of a gate driving and sensing circuit according to an embodiment of the invention. Referring to FIG. 6A, the sensing circuit 215 includes a driving unit 610 and a detecting unit 620. The sensing circuit 215 is configured to perform touch detection on the scan lines G1-Gn. The driving unit 610 supplies a driving signal a to one of the scan lines G1-Gn according to a specified frequency while a detecting unit 620 performs signal extraction on the voltage $V_Q$ at node Q to generate a measuring value D. The output terminals of the output buffers 651 of the gate driver 120 are respectively connected with the scan lines G1-Gn. According to a control signal CS1 from the controller 130, a multiplexer 630 connects the output node Q with one of the output terminals of the output buffers 651 so that the driving signal a can be applied to a corresponding scan line. For example, when a finger is placed on the array substrate 280 above the scan line G1, a finger touch can be detected even though the scan line G1 is separated from the finger by the array substrate 280. According to the invention, a driving signal a with a specified frequency, e.g., a square-wave driving signal with a frequency of 100 KHz and an amplitude of 5V, is applied to the scan lines so that a capacitive coupling is produced between the finger and the scan line G1. Its equivalent impedance Zc is equivalent to $1/(j\omega C_f)$, where the notation $C_f$ denotes the capacitance of a coupling capacitor and the notation $\omega$ denotes a frequency. A grounding loop is formed through the equipotential between the human body and the ambient environment. Thus, a leakage current flows through the human body to ground when the voltage level of the driving signal is greater than or less than the voltage level of the ambient environment. According to the invention, a finger touch is detected by detecting a current leakage through the user's body to ground. An equivalent circuit of the human body consists of a capacitor $C_b$ and a resistor $R_b$. It is noted that the second driving and sensing circuit 420 in FIG. 4B has the same circuit configuration as the gate driving and sensing circuit 220 in FIG. 6A does, but the gate driver 120 needs to be replaced with the second signal driver 425.

FIG. 6B is a circuit schematic diagram of a source driving and sensing circuit according to an embodiment of the invention. Referring to FIG. 6B, the sensing circuit 215' includes a driving unit 610 and a detecting unit 620. The sensing circuit 215' is configured to perform touch detection on the data lines D1-Di. The driving unit 610 supplies a driving signal a to one of the data lines D1-Di according to a specified frequency while a detecting unit 620 performs signal extraction on the voltage $V_Q$ at node Q to generate a measuring value D. The output terminals of the output buffers 651 of the source driver 110 are respectively connected with the data lines D1-Dn. According to a control signal CS2 from the controller 130, a multiplexer 630' connects the output node Q with one of the output terminals of the output buffers 651 so that a driving signal a can be applied to a corresponding data line. It is noted that the first driving and sensing circuit 410 in FIG. 4B has the same circuit configuration as the data driving and sensing circuit 210 in FIG. 6B does, but the data driver 110 needs to be replaced with the first signal driver 415.

On the other hand, although the source driving and sensing circuit 210 in FIG. 6B and the gate driving and sensing circuit 220 in FIG. 6A respectively include only a sensing circuit (215 or 215'), the invention is not limited to the number of the sensing circuits. In general, the greater the number of the sensing circuits, the greater the measurement efficiency but with higher hardware cost. Of course, the source driver 110 and the gate driver 120 may share a common sensing circuit. Optionally, the first signal driver 415 and the second signal driver 425 may share a common sensing circuit. In this case, it will have the minimum hardware cost but will take the longest time interval to complete the whole measurement. Depending on various implementations, the hardware cost is traded off for measurement efficiency.

In the embodiments of FIGS. 6A and 6B, a sensing circuit 215 and a sensing circuit 215' are respectively provided to perform touch detection on the scan lines and the data lines to determine whether there is a finger touch. For simplicity, the operations of the sensing circuit 215 are described with reference to FIG. 6C and 7A-7H. The operations of the sensing circuit 215' are the same as those of the sensing circuit 215 and will not be again discussed.

Figure 7A:
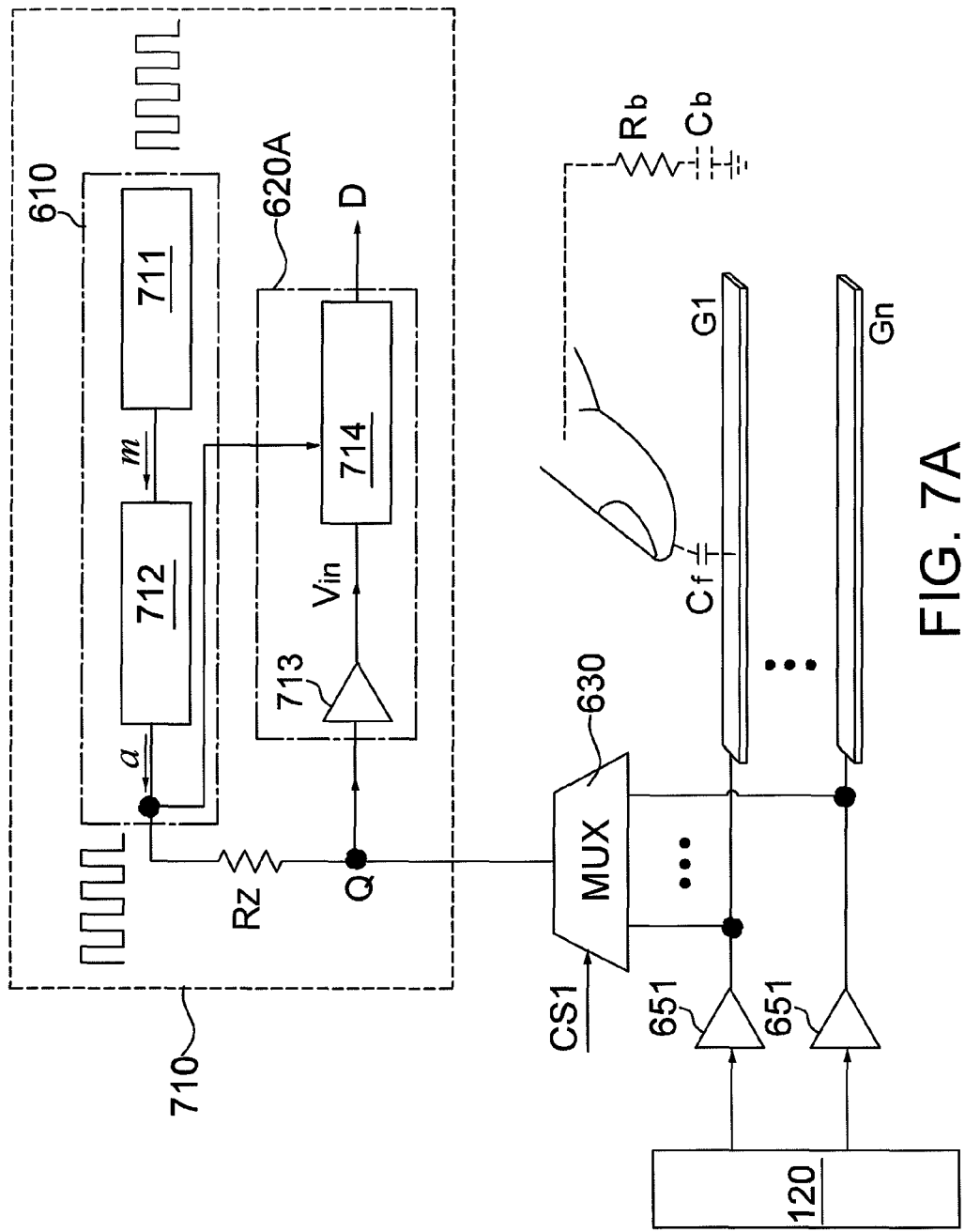
FIG. 7A is a circuit schematic diagram of a sensing circuit according to a first embodiment of the invention.

FIG. 7A is a circuit schematic diagram of a sensing circuit according to a first embodiment of the invention. Referring to FIG. 7A, a sensing circuit 710 includes a driving unit 610 and a detecting unit 620A. The driving unit 610 includes a wave generator 711 and a voltage driver 712 while the detecting unit 620A includes a buffer 713 and a signal extracting unit 714.

Referring to FIGS. 6A and 7A, according to a fixed frequency f1, the wave generator 711 generates a digital signal m having a fixed period T(=1f1) within each measurement time interval $t_m$. According to the digital signal m, the voltage driver 712 sequentially supplies an analog signal a to all the gate signals G1-Gn through a transistor Rz and the multiplexer 630, thereby to perform fixed-period signal measurement. Because of the properties of a high input impedance and a low output impedance, the buffer 713 is configured to isolate the scan lines G1-Gn from the signal extracting unit 714. The input impedance of the buffer 713 is very high, meaning that the input of the buffer 713 does not load down the source or draw any current from it. Because the output impedance of the buffer 713 is low, it drives the load as if it were a voltage source. The buffer 713 receives the voltage $V_Q$ at node Q and then generates a sensing voltage Vin. Since the voltage gain of the buffer 713 is approximately unity, the voltage $V_Q$ is substantially equal to the sensing voltage Vin. According to the driving signal a, the signal extracting unit 714 performs signal extraction on the sensing voltage Vin to generate a measuring value D.

Assuming that when no finger is placed on the touch display device of the invention, $V_Q$ is equal to $V_{mod}$. When the finger is actually placed on the touch display device (e.g., on the top surface of the array substrate 280), a current leakage path through the human body to ground is created. As a result of voltage division, the amplitude of the voltage $V_Q$ is reduced from $V_{mod}$ to $$V_{mod} \times (1/j\omega C_f + R_b + 1/j\omega C_b) \div (R_Z + 1/j\omega C_f + R_b + 1/j\omega C_b),$$

where $V_{mod}$ represents the amplitude of the driving signal a, ω denotes the frequency of the driving signal a, $C_f$ denotes the capacitance of a coupling capacitor and an equivalent circuit of the human body consists of a capacitor $C_b$ and a resistor $R_b$. When the finger is actually placed on the touch display device of the invention, the amplitude of the input voltage $V_Q$ of the buffer 713 is reduced. Accordingly, the amplitude of the sensing voltage Vin with a finger placed on the touch display device is less than the amplitude of the output voltage Vin in the absence of a finger touch. When the signal extracting unit 714 uses the driving signal a to perform signal extraction on the sensing voltage Vin, it acts like a Multiply-and-Add accumulator. If the signal extracting unit 714 is an analog circuit, the calculations that the signal extracting unit 714 makes to obtain the measuring value are equivalent to evaluating the following integral:

$$\int_{T1}^{T2} Vin(T) \times a(T) dT,$$

where Vin(T)×a(T) is the integrand to be evaluated as T varies over the interval [T1, T2] and the interval [T1, T2] is equal to the measurement time interval $t_m$. Obviously, the measuring value D will be smaller when a finger is placed on the touch display device of the invention; by contrast, the measuring value D will be greater when no finger is placed on the touch display device. With respect to circuit control, a microcontroller (not shown) first issues control signal CS1 to the multiplexers 630 to couple the node Q with the scan line G1. Then, the microcontroller measures the magnitude of the measuring value D to determine whether a user's finger is placed on the touch display device. In this manner, the microcontroller sequentially measures each of the scan lines to obtain all the corresponding measuring values D. If a finger or a hand is actually placed on the touch display device of the invention, the microcontroller will correctly identify the finger's or the hand's location.

Figure 8:
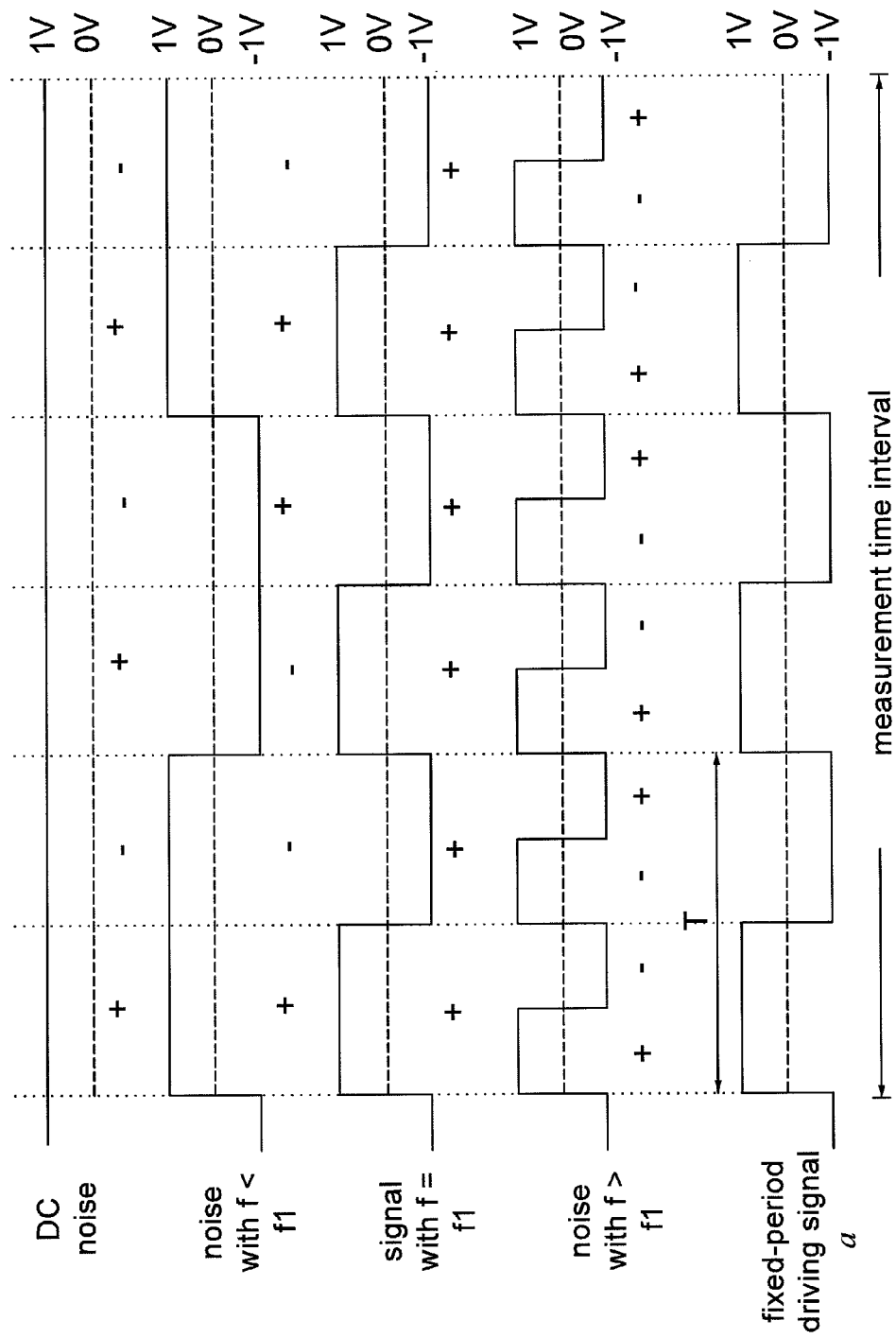
FIG. 8 is an exemplary diagram showing positive terms are canceled by negative terms while the extracting unit performs signal extraction on noise having different frequencies.

FIG. 8 is an exemplary diagram showing positive terms are canceled by negative terms while the extracting unit performs signal extraction on noise having different frequencies. Referring to FIGS. 7A and 8, assuming that the sensing voltage Vin at least includes a DC noise, a noise having a frequency f less than f1 (f<f1), a noise having a frequency f greater than f1 (f>f1) and a signal having a frequency f equal to f1. The driving signal a as shown at the bottom of FIG. 8 is a sequence with a fixed frequency f1 and a period T. Based on signal orthogonality, the signal extracting unit 714 performs signal extraction on the sensing voltage Vin using the driving signal a to obtain a signal having the same sequence as the driving signal a. If the frequency of either the signal or noise contained in the sensing voltage Vin is greater than or less than the frequency f1, the signal extracting unit 714 will obtain a measuring value D of 0 after performing signal extraction. It is because the signal extraction causes positive terms and negative terms to cancel each other out. For example, as measured in volts (V), (1, 1, 1, 1, 1, 1) is a sequence of the voltage levels of a DC noise at the top of FIGS. 8 and (1, −1, 1, −1, 1, −1) is a sequence of the voltage levels of the driving signal a. The signal extraction performed by the signal extracting unit 714 is to sum the products of the corresponding voltage levels of the DC noise and the driving signal a; meanwhile, each product of the corresponding voltage levels of the DC noise and the driving signal a is prefixed by a plus sign or a minus sign as shown at the lower part of the DC noise in FIG. 8. As positive and negative terms cancel each other out, the measuring value D is given by D=1×1+1×(−1)+1×1+1×(−1)+1×1+1×(−1)=0. As shown in the middle of FIG. 8, the signal having a fixed frequency f1 has the same sequence (i.e., (1, −1, 1, −1, 1, −1)) as the driving signal a. On the basis of signal orthogonality, the signal extracting unit 714 performs signal extraction on the signal having a fixed frequency f1 (e.g., summing the products of the corresponding voltage levels of the signal having a fixed frequency f1 and the driving signal a) and then obtains the measuring value D=1×1+(−1)×(−1)+1×1+(−1)×(−1)+1×1+(−1)×(−1)=6. It is because their positive and negative terms do not cancel each other out. Based on signal orthogonality, the signal extracting unit 714 performs signal extraction by using the driving signal a to obtain either an output signal or noise having the same frequency or period as the driving signal a. The process of performing signal extraction is equivalent to performing signal demodulation to eliminate the noise of most frequency bands (e.g., low frequency noise, 50/60 Hz noise, 1/f noise, etc.). Thus, the invention can avoid noise interference and correctly respond to a finger touch.

Figure 7B:
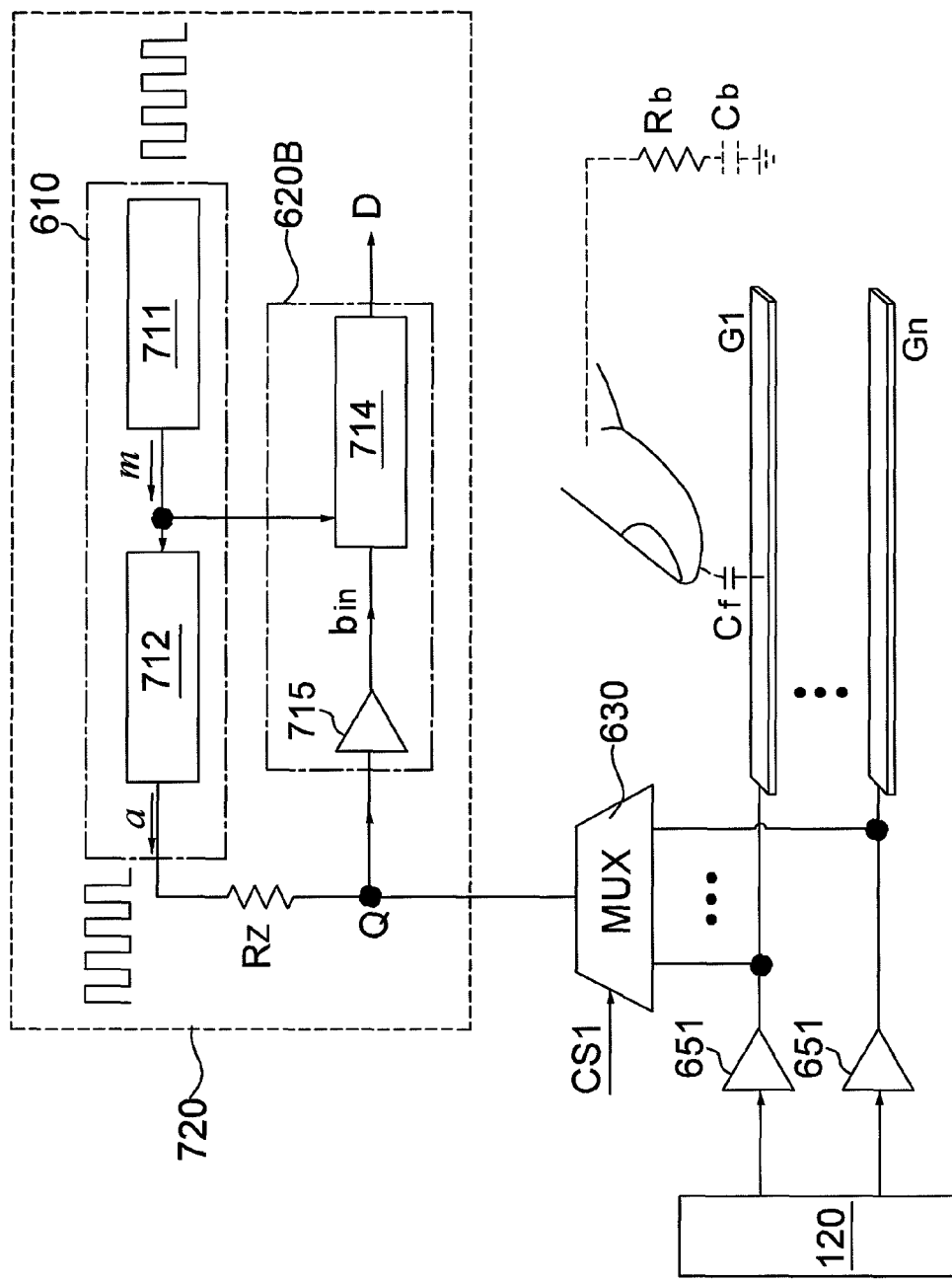
FIG. 7B is a circuit schematic diagram of a sensing circuit according to a second embodiment of the invention.

FIG. 7B is a circuit schematic diagram of a sensing circuit according to a second embodiment of the invention. Referring to FIGS. 7A and 7B, a difference is that the signal extracting unit 714 in the first embodiment is an analog circuit cooperating with a buffer 713 and the signal extracting unit 714 in the second embodiment is a digital circuit cooperating with an analog-to-digital converter (ADC) 715. According to a digital signal m, the signal extracting unit 714 performs signal extraction on the digital signal bin from the ADC 715, acting like a Multiply-and-Add accumulator. As a digital circuit, the signal extracting unit 714 of FIG. 7B obtains the measuring value D by evaluating the following equation:

$$D = \sum_{i=1}^{N} (bin_i * m_i),$$

where the N value denotes the number of times that the digital signal m is multiplied by the digital signal bin during the measurement time interval $t_m$. The process of performing signal extraction is equivalent to performing signal demodulation to eliminate the noise of most frequency bands (e.g., low frequency noise, 50/60 Hz noise, 1/f noise, etc.). Likewise, the measuring value D will be less when a finger is placed on the touch display device of the invention; by contrast, the measuring value D will be greater when no finger is placed on the touch display device. Then, the microcontroller measures the magnitude of the measuring value D to determine whether a user's finger is placed on the corresponding scan line. In the same manner, the microcontroller sequentially measures the scan lines to obtain all the corresponding measuring values D. In this embodiment, the invention can also avoid noise interference and correctly respond to a finger touch.

Figure 7C:
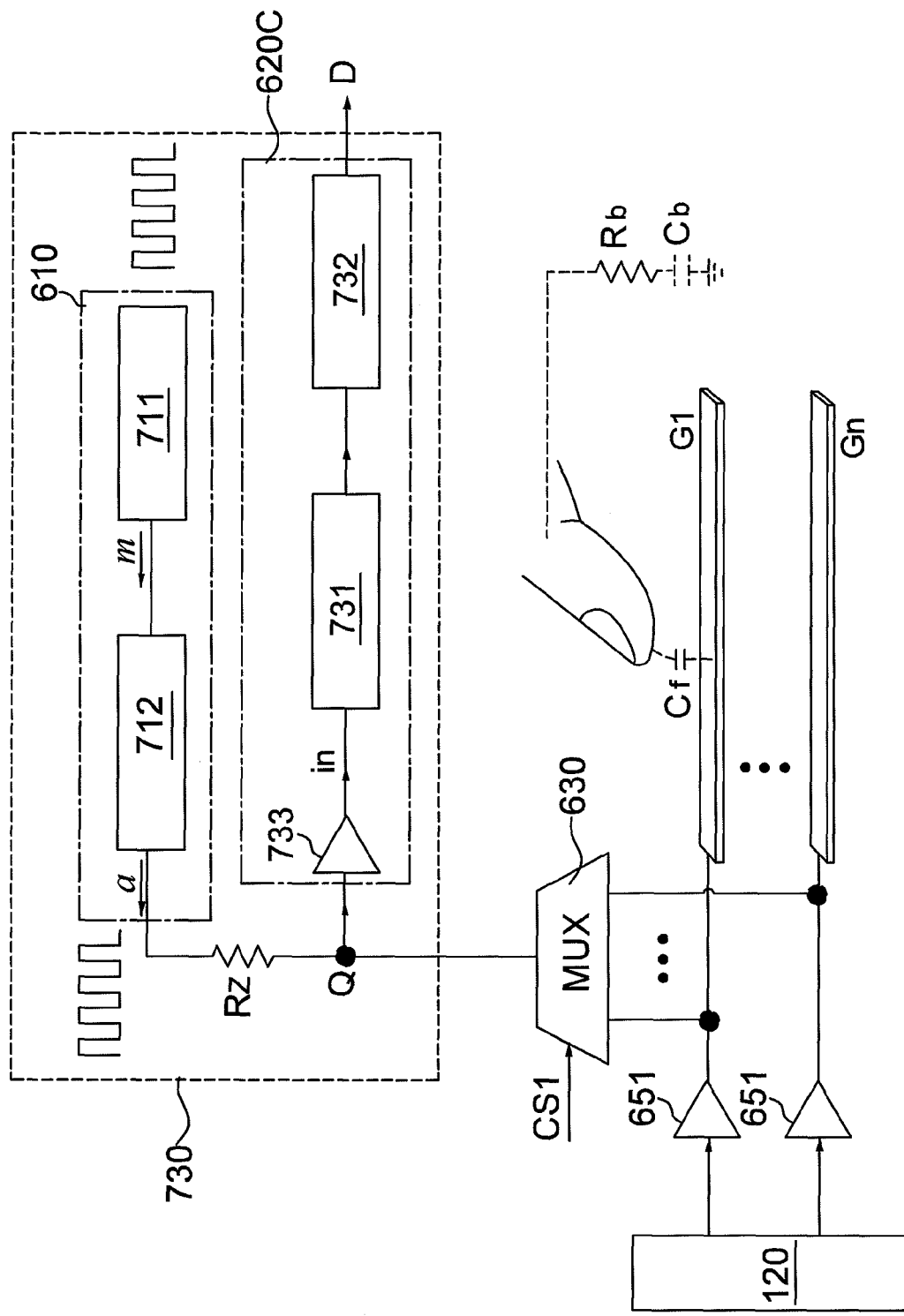
FIG. 7C is a circuit schematic diagram of a sensing circuit according to a third embodiment of the invention.

FIG. 7C is a circuit schematic diagram of a sensing circuit according to a third embodiment of the invention. Comparing FIGS. 7A and 7C, a sensing circuit 730 is similar to the sensing circuit 710. A difference is that a detecting unit 620C includes a band-pass filter 731, a root-mean-square (RMS) unit 732 and an element 733. When the band-pass filter 731 and the RMS unit 732 are digital circuits, the element 733 is an ADC. When the band-pass filter 731 and the root-mean-square unit 732 are analog circuits, the element 733 is a buffer. The central frequency of the bandpass filter 731 is equal to the fixed frequency f1 of the driving signal a. The bandpass filter 731 receives the sensing signal in to attenuate all noise outside the desired frequency range (around the frequency f1). Afterward, the RMS unit 732 calculates the RMS value of the output signal of the bandpass filter 731 to generate a measuring value D. As the first and the second embodiments, the measuring value D will be greater in the third embodiment when no finger is placed on the touch display device of the invention; by contrast, when a finger is placed on the touch display device, a current leakage path to ground is created and thus the measuring value D will be smaller as a result of voltage division. Due to including the bandpass filter 731, the third embodiment can also avoid noise interference and correctly respond to a finger touch.

Figure 7D:
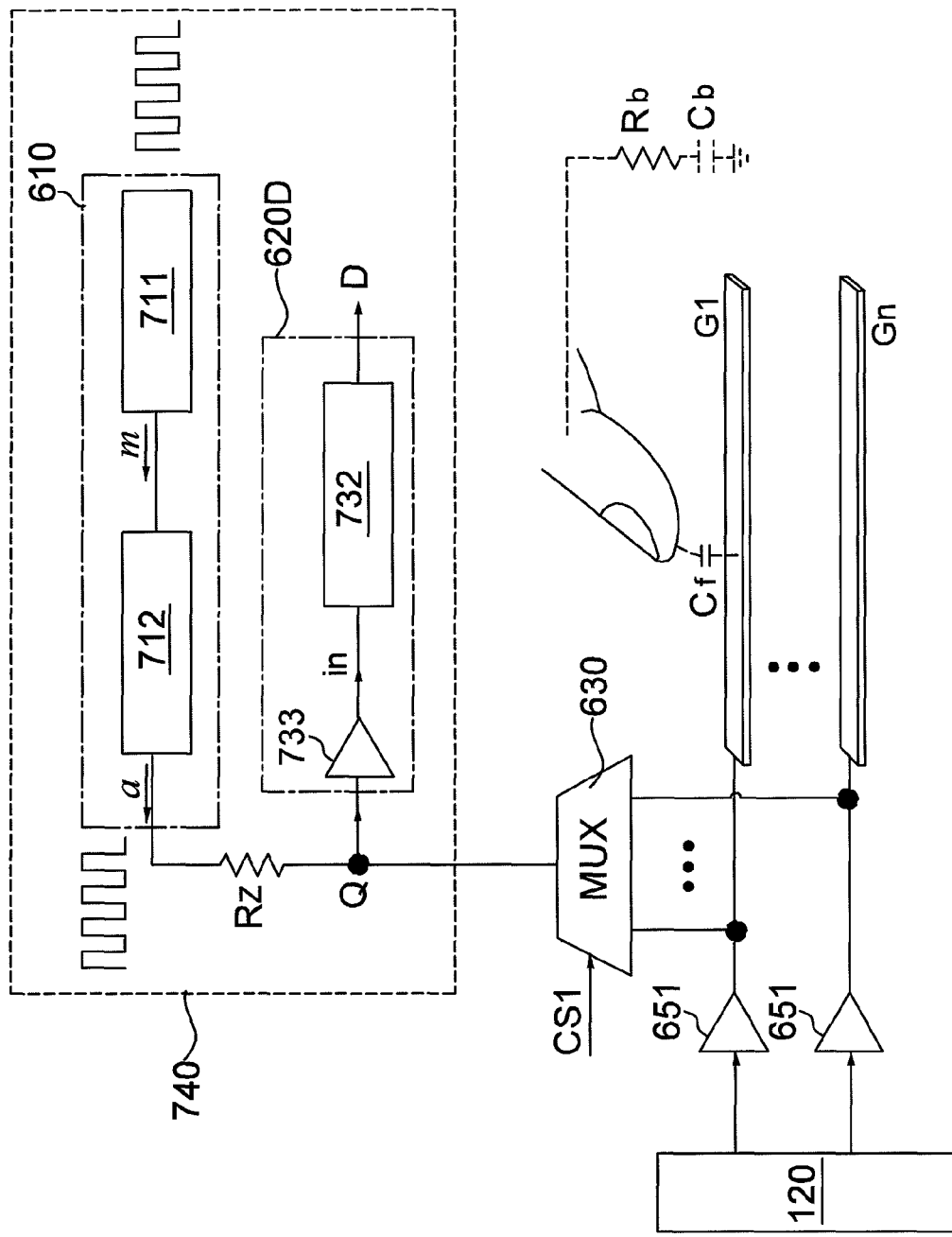
FIG. 7D is a circuit schematic diagram of a sensing circuit according to a fourth embodiment of the invention.

FIG. 7D is a circuit schematic diagram of a sensing circuit according to a fourth embodiment of the invention. In comparison with the third embodiment of FIG. 7C, the bandpass filter 731 is excluded from a detecting unit 620D in FIG. 7D. An advantage of the fourth embodiment is its low-cost circuit design; meanwhile, its drawback is that the circuit is subject to noise interference.

Figure 7E:
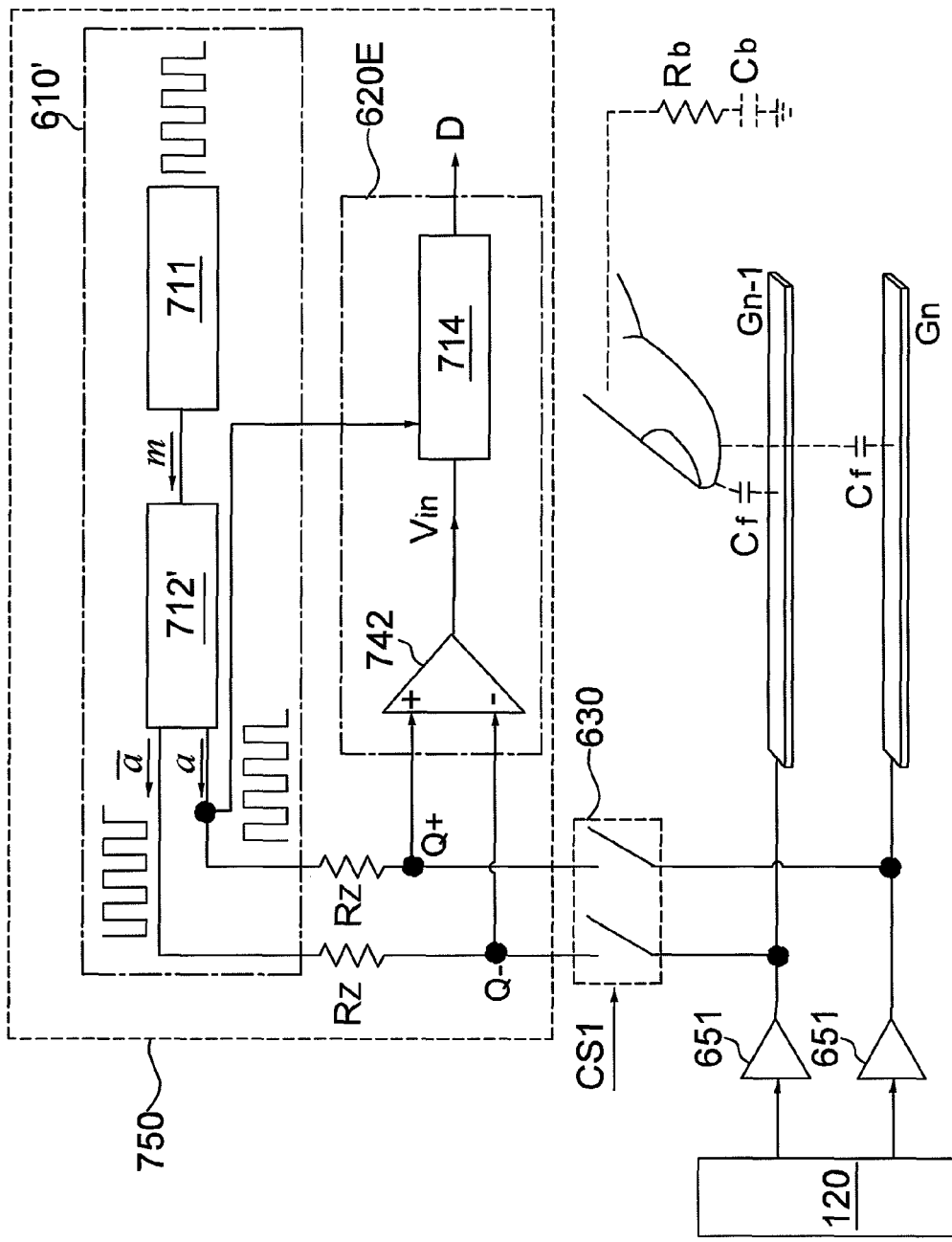
FIG. 7E is a circuit schematic diagram of a sensing circuit according to a fifth embodiment of the invention.

FIG. 7E is a circuit schematic diagram of a sensing circuit according to a fifth embodiment of the invention. Comparing FIGS. 7A and 7E, a sensing circuit 750 is similar to the sensing circuit 710. Two differences between them are: (1) according to the digital signal m, a voltage driver 712' of the driving unit 610' supplies two complementary fixed-period square-wave driving signals a and $\bar{a}$ to any two neighboring scan lines Gn-1 and Gn through the resistors $R_Z$ and the multiplexer 630 within each measurement time interval $t_m$ (2) the detecting unit 620E includes a differential amplifier 742 and a signal extracting unit 714. According to the control signal CS1 form the controller 130, the multiplexer 630 couples the two nodes Q+ and Q− with two neighboring scan lines Gn and Gn-1. The differential amplifier 742 receives two voltages $V_{Q+}$ and $V_{Q−}$ and generates a sensing voltage Vin. Due to its better common mode noise rejection, the differential amplifier 742 is provided to null out low-frequency noises that appear at both inputs. Hereinafter, the term "differential structure" refers to a circuit configuration that uses the driving unit 610' to supply two complementary fixed-period square waves a and $\bar{a}$ to two neighboring scan lines (Gn-1 and Gn) and meanwhile uses the differential amplifier 742 to receive two voltages $V_{Q+}$ and $V_{Q+}$ of two neighboring scan lines (e.g., Gn-1 and Gn). The fifth embodiment can avoid noise interference and correctly respond to a finger touch.

Figure 9A:
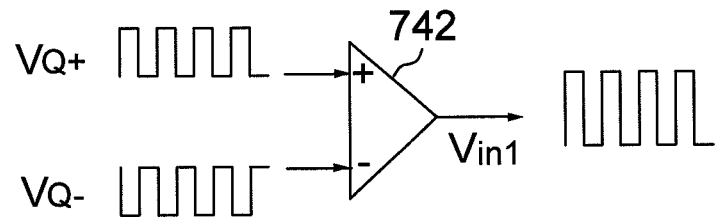
FIG. 9A is a simplified diagram showing the fifth embodiment of FIG. 7E in which no finger is placed on the touch display device of the invention.

FIG. 9A is a simplified diagram showing the fifth embodiment of FIG. 7E in which no finger is placed on the touch display device of the invention. Referring to FIG. 9A, when no finger is placed on the touch display device, the output voltage $Vin_1$ of the differential amplifier 742 has the same period as the square waves a and $\bar{a}$, representing the square waves a and $\bar{a}$ and the output voltage $Vin_1$ have the same sequences.

Figure 9B:
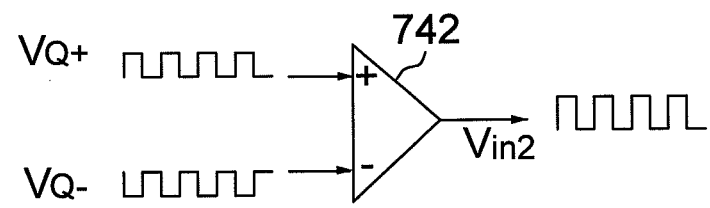
FIG. 9B is a simplified diagram showing the fifth embodiment of FIG. 7E in which a finger touch is simultaneously detected by two scan lines connected with two input terminals of the same differential amplifier.

FIG. 9B is a simplified diagram showing the fifth embodiment of FIG. 7E in which a finger touch is simultaneously detected by two scan lines connected with two input terminals of the same differential amplifier. Referring to FIG. 9B, when a finger is placed on the touch display device of the invention and a finger touch is simultaneously detected by two scan lines connected with two input terminals of the same differential amplifier, a current leakage path from the two scan lines through the human body to ground is created. As a result of voltage division, the amplitudes of two input voltages $V_{Q+}$ and $V_{Q−}$ of the differential amplifier 742 are reduced at the same time. Accordingly, referring to FIGS. 9A and 9B, the amplitude of the sensing voltage $Vin_2$ of the differential amplifier 742 with a finger placed on the touch display device (FIG. 9B) is less than the amplitude of the sensing voltage $Vin_1$ of the differential amplifier 742 in the absence of a finger touch (FIG. 9A). It is clear that the sensing voltage $Vin_2$ of the differential amplifier 742 has the same period as the square waves a and $\bar{a}$ do.

Figure 9C:
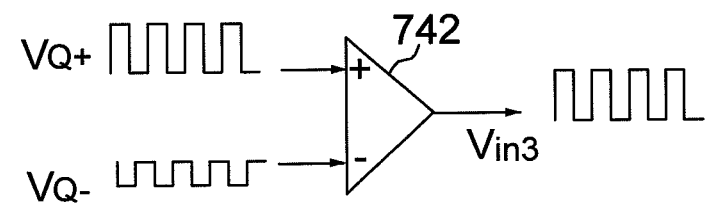
FIG. 9C is a simplified diagram showing the fifth embodiment of FIG. 7E in which a finger touch is detected by only one scan line.

FIG. 9C is a simplified diagram showing the fifth embodiment of FIG. 7E in which a finger touch is detected by only one scan line. Referring to FIG. 9C, when a finger is placed on the touch display device of the invention and a finger touch is detected by a scan line connected with the negative input terminal of the differential amplifier 742, a current leakage path from the scan line through the human body to ground is created. As a result of voltage division, the amplitude of the input voltage $V_{Q-}$ of the differential amplifier 742 is reduced. Accordingly, referring to FIGS. 9A and 9C, it is clear that the amplitude of the sensing voltage $Vin_3$ of the differential amplifier 742 with a finger placed on the touch display device (FIG. 9C) is less than the amplitude of the sensing voltage $Vin_1$ of the differential amplifier 742 in the absence of a finger touch (FIG. 9A). As can be observed from FIG. 9C, when a finger is placed on the touch display device and a finger touch is detected by a scan line connected with the negative input terminal of the differential amplifier 742, the sensing voltage $Vin_3$ of the differential amplifier 742 has the same period as the square waves a and $\bar{a}$, but has a smaller amplitude. Comparing FIGS. 9A-9C, the amplitude of the sensing voltage $Vin_3$ of the differential amplifier 742 with the finger touch detected by a scan line (FIG. 9C) is less than the amplitude of the sensing voltage $Vin_1$ of the differential amplifier 742 in the absence of a finger touch (FIG. 9A), but greater than the amplitude of the output voltage $Vin_2$ of the differential amplifier 742 with the finger touch simultaneously detected by two scan lines (FIG. 9B). In practice, when a finger touch is detected by one scan line or two scan lines, the amplitude of the sensing voltage Vin of the differential amplifier 742 will be reduced similarly, resulting in a reduced measuring value D (with respect to a measuring value D in the absence of a finger touch).

Figure 7F:
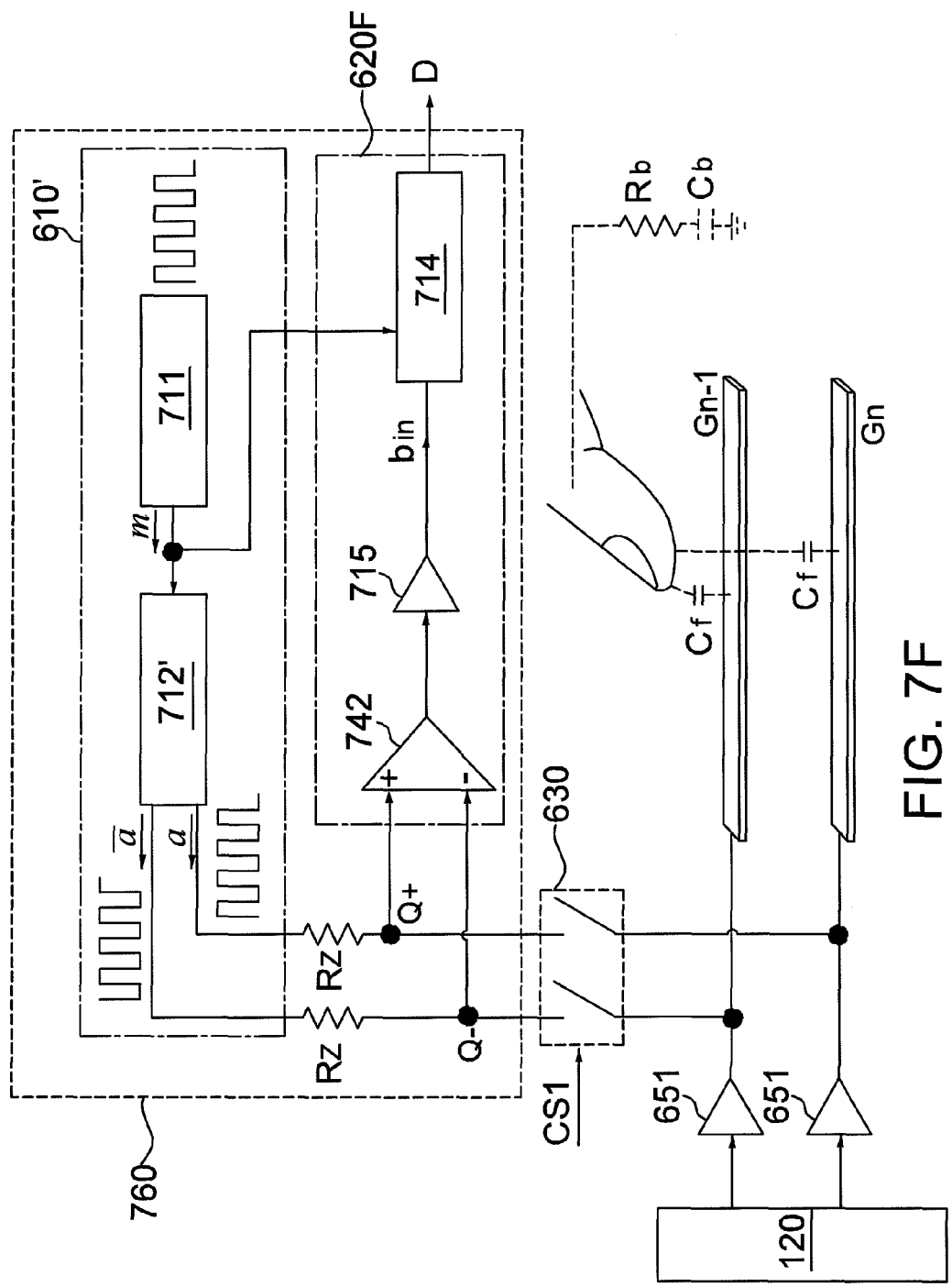
FIG. 7F is a circuit schematic diagram of a sensing circuit according to a sixth embodiment of the invention.

FIG. 7F is a circuit schematic diagram of a sensing circuit according to a sixth embodiment of the invention. Comparing FIGS. 7B and 7F, a sensing circuit 760 is similar to the sensing circuit 720. A difference between them is that the sensing circuit 760 has a differential structure. The sixth embodiment can avoid noise interference and correctly respond to a finger touch.

It is noted that, in the first and the second embodiments of FIGS. 7A and 7B, for each measurement, the wave generator 711 may also generate an unfixed-period digital signal m by randomly combining different frequencies during each measurement time interval $t_m$. After that, the voltage driver 712 generates the analog driving signal a according to the unfixed-period digital signal a (hereinafter called "unfixed-period signal measurement"). In the same manner, in the fifth and the sixth embodiments of FIGS. 7E and 7F, for each measurement, the wave generator 711 may also generate an unfixed-period digital signal m by randomly combining different frequencies during each measurement time interval $t_m$. After that, the voltage driver 712 generates two complementary fixed-period square waves a and $\bar{a}$ referenced to a common ground according to the unfixed-period digital signal m. Since several different frequencies are randomly combined to obtain the unfixed-period digital signal m for each measurement, the risk of the fixed frequency band noise attack is minimized. Thus, the circuit is immune from the noise interference of a certain specified frequency. It is also noted that, when the extracting unit 714 performs signal extraction on a noise or a signal having a frequency different from those of the driving signal, the effect that the positive terms are canceled by negative terms as shown in FIG. 8 is produced not only in the process of performing the fixed-period signal measurement, but in the process of performing the unfixed-period (a plurality of randomly combined frequencies) signal measurement. However, with respect to the unfixed-period signal measurement, the effect that the positive terms are canceled by negative terms associated with a noise or a signal having frequencies different from those of the driving signal can be observed only when the time axis is extended long enough.

Figure 7G:
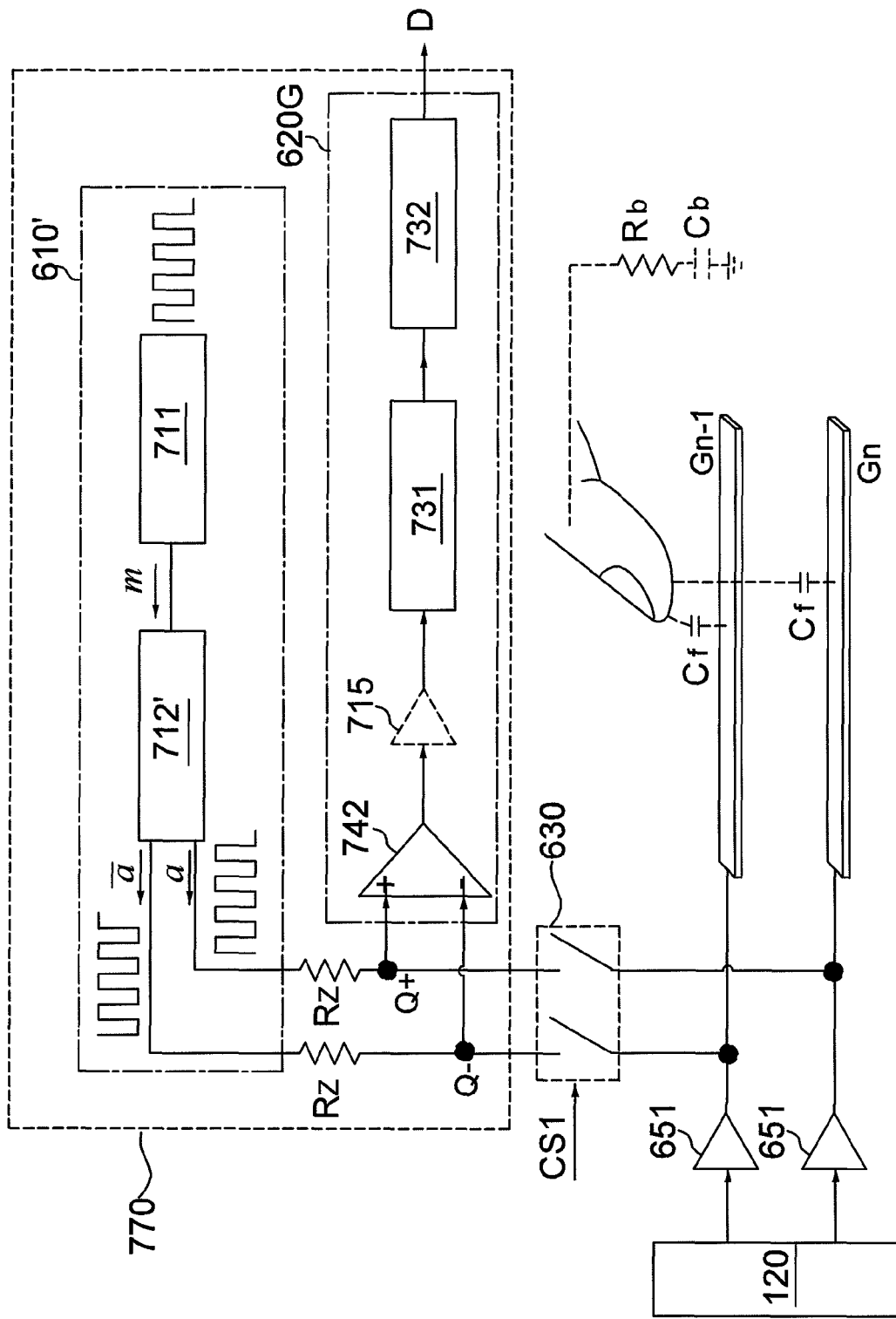
FIG. 7G is a circuit schematic diagram of a sensing circuit according to a seventh embodiment of the invention.

FIG. 7G is a circuit schematic diagram of a sensing circuit according to a seventh embodiment of the invention. Comparing FIGS. 7C and 7G, a sensing circuit 770 is similar to the sensing circuit 730. A difference between them is that the sensing circuit 770 has a differential structure. A detecting unit 620G includes a differential amplifier 742, an ADC 715, a bandpass filter 731 and a RMS unit 732. Here, when the bandpass filter 731 and the RMS unit 732 are digital circuits, the bandpass filter 731 and the RMS unit 732 operate with the ADC 715. However, when the bandpass filter 731 and the RMS unit 732 are analog circuits, the bandpass filter 731 and the RMS unit 732 operate without the ADC 715. The ADC 715 is an optional element and thus represented in dotted lines. Due to including the bandpass filter 731, the seventh embodiment can avoid noise interference and correctly respond to a finger touch.

Figure 7H:
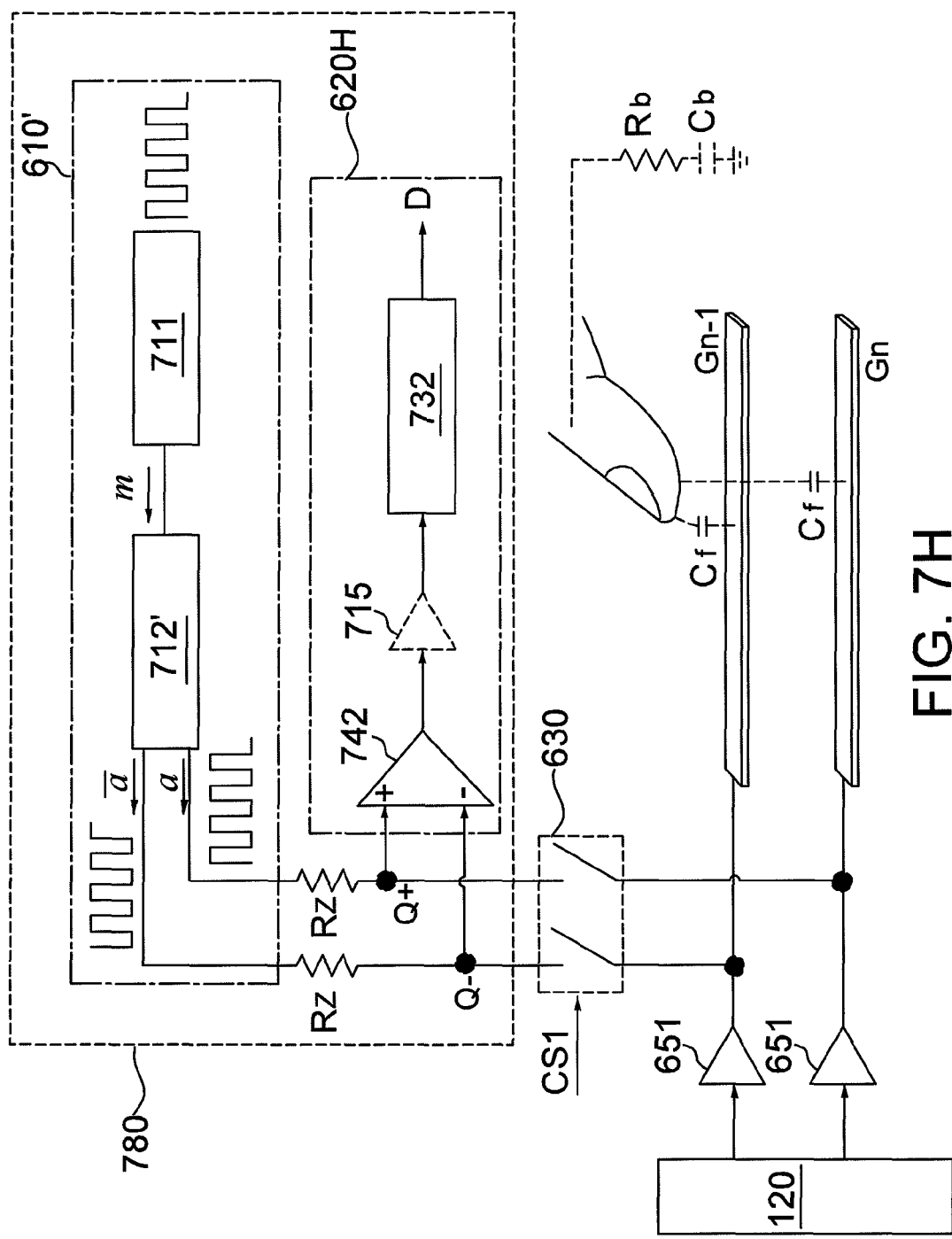
FIG. 7H is a circuit schematic diagram of a sensing circuit according to an eighth embodiment of the invention.

FIG. 7H is a circuit schematic diagram of a sensing circuit according to an eighth embodiment of the invention. Comparing FIGS. 7D and 7H, a sensing circuit 780 is similar to the sensing circuit 740. A difference between them is that the sensing circuit 780 has a differential structure. A detecting unit 620H includes a differential amplifier 742, an ADC 715 and a RMS unit 732. Here, when the RMS unit 732 is a digital circuit, the RMS unit 732 operates with the ADC 715. However, when the RMS unit 732 is an analog circuit, the RMS unit 732 operates without the ADC 715. The ADC 715 is an optional element and thus represented in dotted lines.

It is noted that, although either the driving signal a or the two complementary driving signals a and $\bar{a}$ shown in FIGS. 7A-7H are square waves, they can be implemented using sinusoidal waves, or triangular waves, or any other periodic waves.

Figure 6C:
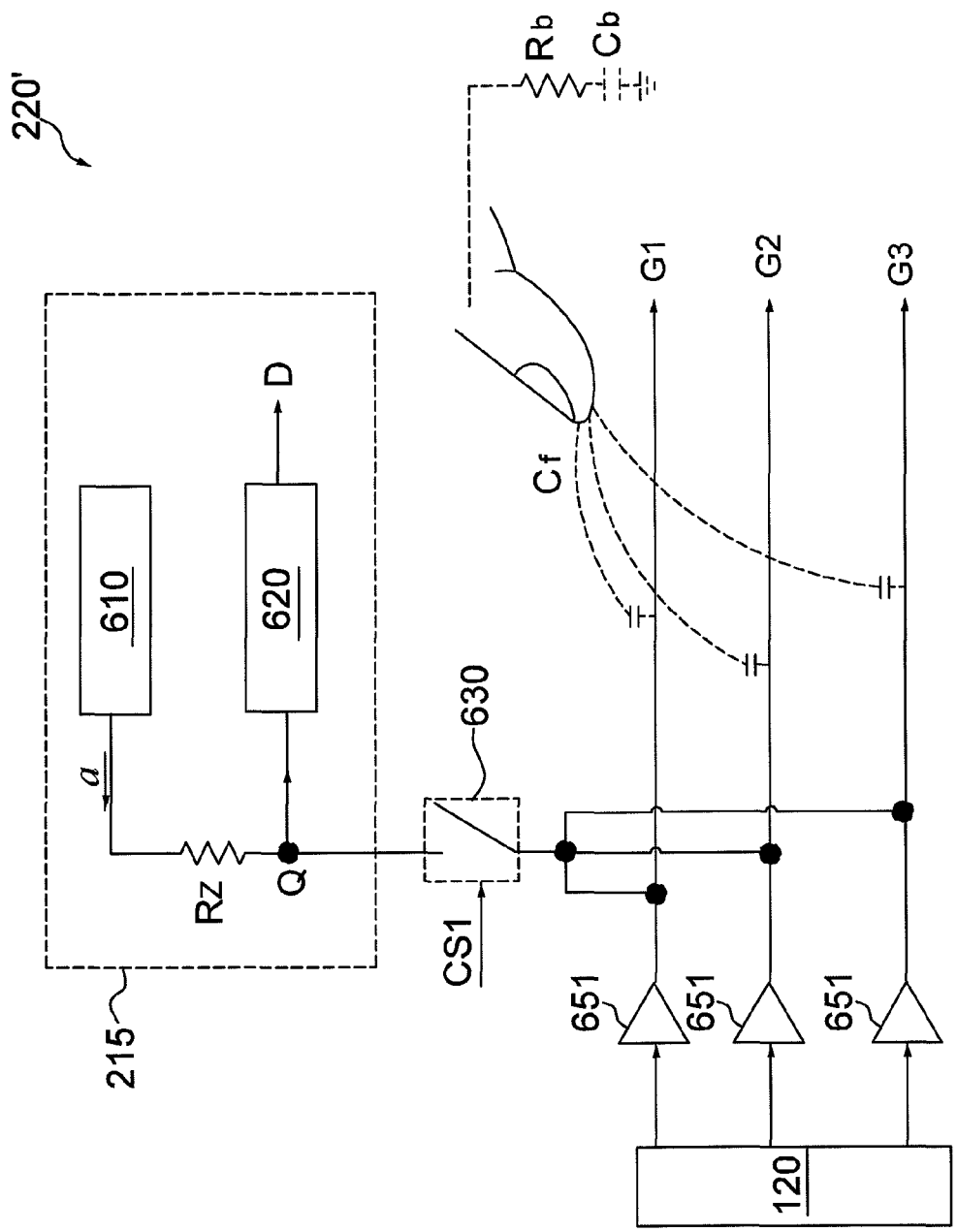
FIG. 6C is a simplified diagram showing the embodiment of FIG. 6A in which three scan lines form a sensing channel.

FIG. 6C is a simplified diagram showing the embodiment of FIG. 6A in which three scan lines form a sensing channel. Normally, the capacitance of a coupling capacitor $C_f$ caused by the finger touch is about 1 pF. In order to increase the magnitude of the voltage $V_Q$ at the node Q, a plurality of neighboring scan lines are arranged to form a sensing channel. This is equivalent to increasing the touch area between the conductors and the finger, thereby to increase the capacitance of the coupling capacitor $C_f$. Regarding the embodiment of FIG. 6C, three scan lines G1-G3 form a sensing channel ch1, three scan lines G4-G6 form a sensing channel ch2, three scan lines G7-G9 form a sensing channel ch3, and so on. Likewise, a plurality of neighboring data lines in FIG. 6B can be arranged to form a sensing channel.

Figure 10A:
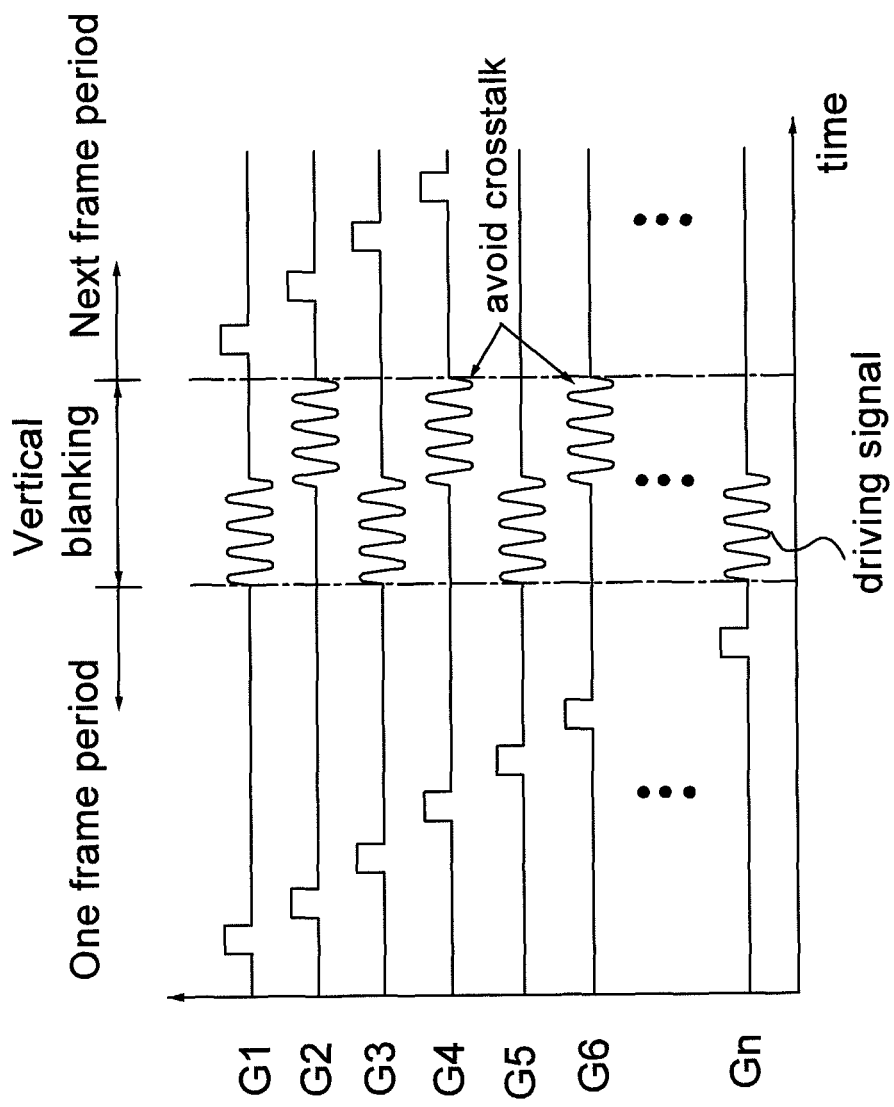
FIGS. 10A-10C show three different modes that a touch display device uses to perform touch detection on scan lines according to the invention.
Figure 10B:
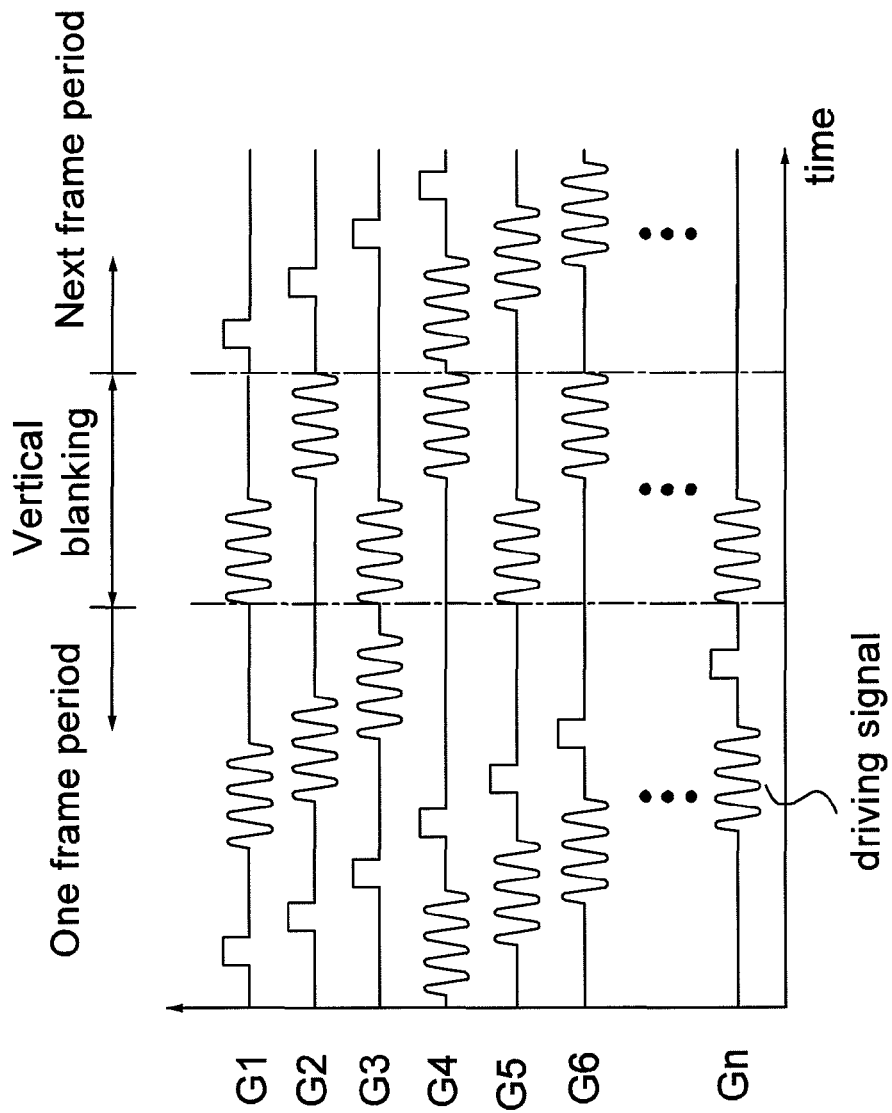
Figure 10C:
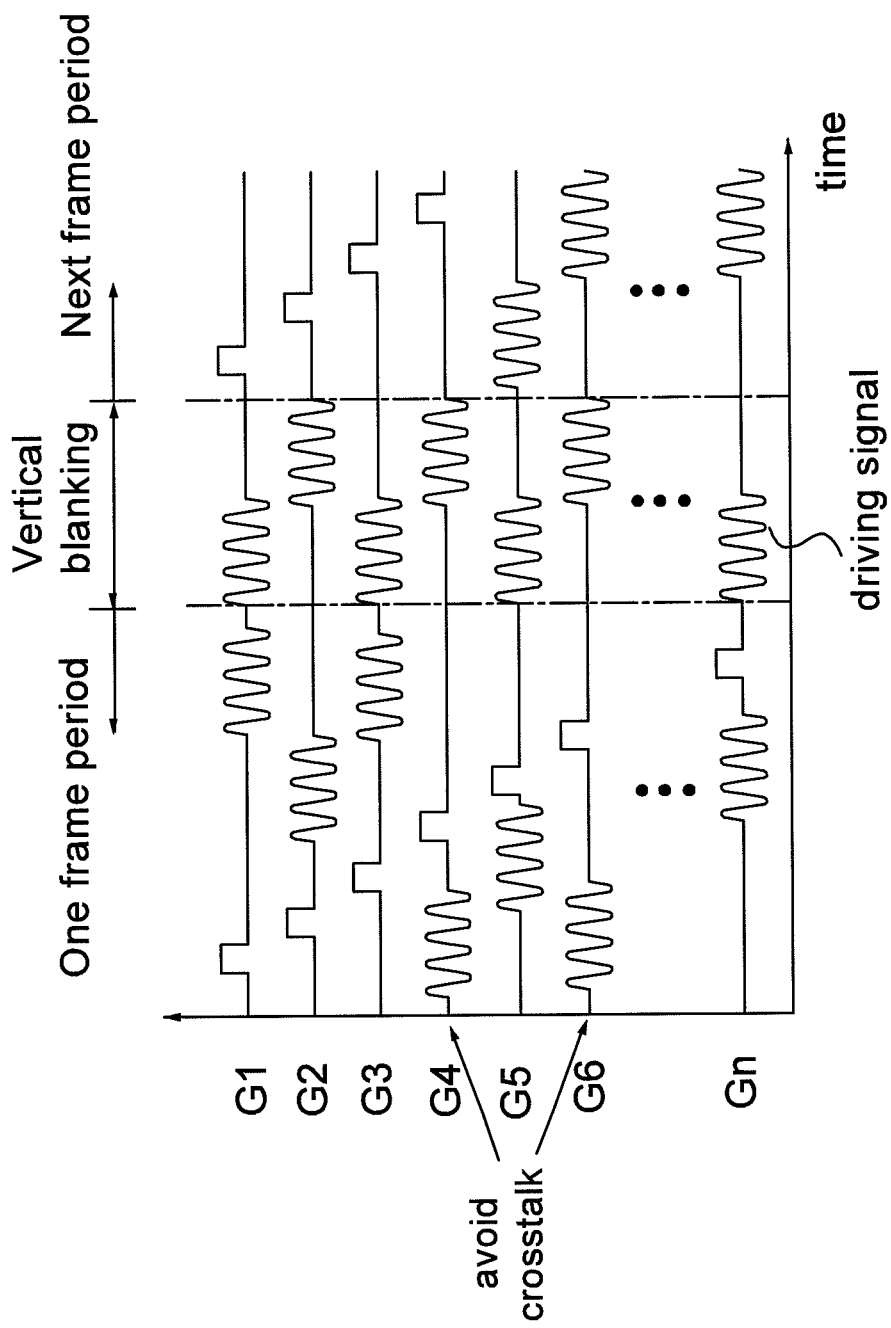

Since the touch display device of the invention uses the scan lines and the data lines to display images and detect finger touches, the touch detection is not allowed to affect image display. FIGS. 10A-10C show three different modes that the touch display device uses to perform touch detection on the scan lines according to the invention. In FIGS. 10A-10C, each square wave represents it is used to turn on the TFT 115 of each pixel of the corresponding scan line while each sinusoidal wave represents it is used to perform touch detection.

FIG. 10A shows a first mode that the touch display device uses to perform touch detection on the scan lines during a vertical blanking period. In order to avoid crosstalk between neighboring scan lines, the scan lines on which the touch detection are performed have at least one dummy scan line (on which no touch detection is performed) between them, or the scan lines on which the touch detection are performed are not adjacent to each other, e.g., G1, G3, G5, . . . , and Gn. Besides, the scan lines G1, G3, G5, . . . , and Gn are respectively connected with different sensing circuits so that the different sensing circuits can simultaneously perform touch detection on the scan lines G1, G3, G5, . . . , and Gn. Otherwise, the system is not able to correctly identify the finger's or the hand's location. It is noted that the sensing circuit can also use the first mode to perform finger touch detection on the data lines.

FIG. 10B shows a second mode that the touch display device uses to perform touch detection on the scan lines during a frame period. Referring to FIG. 10B, when a gate pulse is being applied to a scan line (hereinafter called "displayed scan line"), a sensing circuit can perform touch detection on another scan line (hereinafter called "detected scan line") simultaneously. In order to avoid signal interferences, the sensing circuit must be a noise-immune circuit, e.g., the first to the third embodiments and the fifth to the seventh embodiments in FIGS. 7A-7C and 7E-7G. Obviously, the further a displayed scan line is away from a detected scan line, the better the noise immunity. FIG. 10C shows a third mode that the touch display device uses to perform touch detection on the scan lines during a frame period. Referring to FIG. 10C, the third mode is analogous with the second mode. When a gate pulse is being applied to a scan line (i.e., a displayed scan line), different sensing circuits can simultaneously perform touch detection on a plurality of other scan lines (i.e., detected scan lines). In order to avoid signal interferences, the detected scan lines have at least one dummy scan line (on which no touch detection is performed) between them or the detected scan lines are not adjacent to each other, e.g, G1, G3, G5, . . . , and Gn. Besides, the scan lines G1, G3, G5, . . . , and Gn are respectively connected to different sensing circuits so that the different sensing circuits can simultaneously perform touch detection on the scan lines G1, G3, G5, . . . , and Gn. Otherwise, the finger's or the hand's location can not be correctly identify.

It is noted that the sensing circuit can not use the second and the third modes to perform touch detection on the data lines. Besides, to prevent touch detection from affecting image display, it should be noted that the voltage of the driving signal a must not turn on the TFT 115 ($V_{gs}$>0). If the TFT 115 is turned on, the voltage value of the LC capacitor 116 will be affected. According to the invention, a solution is that the voltages of the driving signals a that the sensing circuit supplies to the scan lines must be less than the voltages of the driving signals a that the sensing circuit supplies to the data lines, i.e., $V_{gs}$<0. Accordingly, the TFTs 115 will not be turned on.

In sum, the AM touch display device of the invention reverses the positions of the array substrate and the opposite substrate so that the array substrate 280 including the data lines and the scan lines is positioned at (or close to) the top and the opposite substrate 270 including the common electrode 172 is positioned at (or close to) the bottom (the reversed AM structure). Accordingly, based on the reversed AM structure having the scan lines and the data lines intersecting with each other orthogonally, the AM touch display device correctly detects a finger touch by means of detecting a current leakage through the human body to the ground. Without additional touch device, either the reversed AM structure or a PM structure is provided to combine with the human body's conductive properties and the noise-immune sensing circuit design, thereby to achieve the purpose of displaying images and performing multi-touch detection simultaneously. Thus, the hardware cost and the power consumption are reduced.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An active-matrix touch display device, comprising:
   an array substrate having a top surface, a bottom surface opposite the top surface and a signal layer, the signal layer disposed on the bottom surface, the signal layer including plural scan lines and plural data lines, wherein pixels are respectively formed at intersections of the plural scan lines and the plural data lines, and each pixel includes a switching element and a pixel electrode;
   an opposite substrate disposed to be opposite the array substrate and having a common electrode opposite the pixel electrodes, wherein the opposite substrate is positioned farther from a user than the array substrate is;
   a display material layer sandwiched between the array substrate and the opposite substrate;
   a gate driver for sequentially supplying a gate pulse to the plural scan lines, wherein output terminals of the gate driver and the scan lines are connected at plural first connection nodes;
   a source driver for supplying plural image data to the plural data lines, wherein output terminals of the source driver and the data lines are connected at plural second connection nodes;
   at least one sensing circuit for performing touch detection on at least one of the plural scan lines and the plural data lines, each of the at least one sensing circuit comprising:
   a driving unit for supplying a driving signal via at least one conductive line path to at least one of the plural first connection nodes and the plural second connection nodes according to a specified frequency; and
   a detecting unit for performing signal extraction on at least one of output signals of the plural first connection nodes and the plural second connection nodes according to the specified frequency to generate a measuring value,
   wherein the driving unit and the detecting unit both use at least a portion of the at least one conductive line path; and
   a controller for controlling the gate driver, the source driver and the at least one sensing circuit.

2. The touch, display device according to claim 1, wherein the driving unit comprises:
   a wave generator for generating a digital signal according to the specified frequency within a fixed measurement time interval; and
   a voltage driver for generating the driving signal according to the digital signal.

3. The touch display device according to claim 1, wherein, during a frame period, when the gate pulse is supplied to one of the plural scan lines, the at least one sensing circuit simultaneously performs the touch detection on at least one of the other plural scan lines to identify a touch position and the at least one of the other plural scan lines is not adjacent to the one of the plural scan lines.

4. The touch display device according to claim 3, wherein a number of the at least one sensing circuit is equal to the number of the at least one of the other plural scan lines on which the touch detection are simultaneously performed, and wherein the at least one of the other plural scan lines are not adjacent to each other.

5. The touch display device according to claim 1, wherein, during a vertical blanking period, the at least one sensing circuit simultaneously performs touch detection on at least one of the plural scan lines and the plural data lines to identify a touch position; wherein a number of the at least one sensing circuit is equal to the number of the at least one of the plural scan lines and the plural data lines on which the touch detection are simultaneously performed: and wherein the at least one of the plural scan lines and the plural data lines on which the touch detection are simultaneously performed are not adjacent to each other.

6. The touch display device according to claim 1, wherein the detecting unit comprises:
a bandpass-filter for performing filtering on the at least one of the output signals according to the specified frequency and generating a filtered signal; and
a root mean square unit for calculating a root mean square value of the filtered signal and generating the measuring value;
wherein the specified frequency is fixed.

7. The touch display device according to claim 1, wherein the detecting unit comprises:
a signal extracting unit for performing signal demodulation on the at least one of the output signals according to the driving signal and generating the measuring value;
wherein the specified frequency is either a fixed frequency or a combination of random frequency components.

8. The touch display device according to claim 1, wherein the driving signal is a differential signal referenced to a common ground.

9. The touch display device according to claim 8, wherein the detecting unit comprises:
a differential amplifier for receiving two of the output signals of two corresponding connection nodes that receive the differential signal referenced to the common ground and eliminating low-frequency noise to generate a sensing signal;
a bandpass filter for performing filtering on the sensing signal according to the specified frequency and generating a filtered signal; and
a root mean square unit for calculating a root mean square value of the filtered signal and generating the measuring value;
wherein the specified frequency is fixed.

10. The touch display device according to claim 8, wherein the detecting unit comprises:
a differential amplifier for receiving two of the output signals of two corresponding connection nodes that receive the differential signal referenced to the common ground and eliminating low-frequency noise to generate a sensing signal; and
a signal extracting unit for performing signal demodulation on the sensing signal according to the driving signal and generating the measuring value;
wherein the specified frequency is either a fixed frequency or a combination of random frequency components.

11. The touch display device according to claim 1, wherein the display material layer comprises a plurality of microcapsules.

12. The touch display device according to claim 1, wherein the display material layer comprises a plurality of electroluminescence (EL) elements.

13. The touch display device according to claim 1, wherein the display material layer comprises a liquid crystal (LC) material.

14. The touch display device according to claim 1, wherein a voltage level of a first driving signal supplied to at least one of the plural first connection nodes is less than a voltage level of a second driving signal supplied to at least one of the plural second connection nodes to prevent a corresponding switching element t from being turned on.

15. The touch display device according to claim 1, wherein each of the at least one sensing circuit performs touch detection on a corresponding sensing channel to increase a coupling capacitance, and wherein each corresponding sensing channel comprises either plural adjacent scan lines coupled with each other or plural adjacent data lines coupled with each other.

16. A passive-matrix touch display device, comprising:
a first substrate having a top surface, a bottom surface opposite the top surface and a first signal layer, the first signal layer disposed on the bottom surface, the first signal layer including plural first signal lines;
a second substrate disposed to be opposite the first substrate and having a second signal layer opposite the first signal layer, the second signal layer including plural second signal lines, wherein the second substrate is positioned farther from a user than the first substrate is;
a display material layer sandwiched between the first substrate and the second substrate;
a first signal driver for supplying at least one first voltage signal to the plural first signal lines, wherein output terminals of the first signal driver and the first signal lines are connected at plural first connection nodes;
a second signal driver for supplying at least one second voltage signal to the plural second signal lines, wherein output terminals of the second signal driver and the second signal lines are connected at plural second connection nodes;
at least one sensing circuit for performing touch detection on at least one of the plural first signal lines and the plural second signal lines, each of the at least one sensing circuit comprising:
a driving unit for supplying a driving signal via at least one conductive line path to at least one of the plural first connection nodes and the plural second connection nodes according to a specified frequency; and
a detecting unit for performing signal extraction on at least one of output signals of the plural first connection nodes and the plural second connection nodes according to the specified frequency to generate a measuring value,
wherein the driving unit and the detecting unit both use at least a portion of the at least one conductive line path; and
a controller for controlling the first signal driver, the second signal driver and the at least one sensing circuit.

17. The touch display device according to claim 16, wherein the driving unit comprises:
a wave generator for generating a digital signal according to the specified frequency within a fixed measurement time interval; and
a voltage driver for generating the driving signal according to the digital signal.

18. The touch display device according to claim 16, wherein, when the plural first signal lines are scan lines, the plural second signal lines are data lines; and wherein, when the plural second signal lines are scan lines, the plural first signal lines are data lines.

19. The touch display device according to claim 18, wherein, during a frame period, when a gate pulse is supplied to one of the plural scan lines, the at least one sensing circuit simultaneously performs touch detection on at least one of the other plural scan lines to identify a touch position and the at least one of the other plural scan lines is not adjacent to the one of the plural scan lines.

20. The touch display device according to claim 19, wherein a number of the at least one sensing circuit is equal to the number of the at least one of the other plural scan lines on which the touch detection are simultaneously performed, and wherein the at least one of the other plural scan lines are not adjacent to each other.

21. The touch display device according to claim 16, wherein, during a vertical blanking period, the at least one sensing circuit simultaneously performs touch detection on at least one of the plural first signal lines and the plural second signal lines to identify a touch position; wherein a number of the at least one sensing circuit is equal to the number of the al least one of the plural scan lines and the plural data lines on which the touch detection are simultaneously performed; and wherein the at least one of the plural scan lines and the plural data lines On which the touch detection are simultaneously performed are not adjacent to each other.

22. The touch display device according to claim 16, wherein the detecting unit comprises:
   a bandpass-filter for performing filtering operations on the at least one of the output signals according to the specified frequency and generating a filtered signal; and
   a root mean square unit for calculating a root mean square value of the filtered signal and generating the measuring value;
   wherein the specified frequency is fixed.

23. The touch display device according to claim 16, wherein the detecting unit comprises:
   a signal extracting unit for performing signal demodulation on the at least one of the output signals according to the driving signal and generating the measuring value;
   wherein the specified frequency is either a fixed frequency or a combination of random frequency components.

24. The touch display device according to claim 16, wherein the driving signal is a differential signal referenced to a common ground.

25. The touch display device according to claim 24, wherein the detecting unit comprises:
   a differential amplifier for receiving two of the output signals of two corresponding connection nodes that receive the differential signal referenced to the common ground and eliminating low-frequency noise to generate a sensing signal;
   a bandpass filter for performing filtering operations on the sensing signal according to the specified frequency and generating a filtered signal; and
   a root mean square unit for calculating a root mean square value of the filtered signal and generating the measuring value;
   wherein the specified frequency is fixed.

26. The touch display device according to claim 24, wherein the detecting unit comprises:
   a differential amplifier for receiving two of the output signals of two corresponding connection nodes that receive the differential signal referenced to the common ground and eliminating low-frequency noise to generate a sensing signal; and
   a signal extracting unit for performing signal demodulation on the sensing signal according to the driving signal and generating the measuring value;
   wherein the specified frequency is either a fixed frequency or a combination of random frequency components.

27. The touch display device according to claim 16, wherein the display material layer comprises a plurality of microcapsules.

28. The touch display device according to claim 16, wherein the display material layer comprises a plurality of electroluminescence (EL) elements.

29. The touch display device according to claim 16, wherein the display material layer comprises a liquid crystal (LC) material.

30. The touch display device according to claim 16, wherein each of the at least one sensing circuit performs touch detection on a corresponding sensing channel to increase a coupling capacitance, and wherein each corresponding sensing channel comprises either plural adjacent first signal lines coupled with each other or plural adjacent second signal lines coupled with each other.

* * * * *